(12) United States Patent
Klochikhin et al.

(10) Patent No.: US 12,164,040 B2
(45) Date of Patent: Dec. 10, 2024

(54) SYSTEM AND METHOD FOR HIGH ACCURACY LOCATION DETERMINATION AND ENERGY DISPENSING

(71) Applicant: Parkofon Inc., Vienna, VA (US)

(72) Inventors: Evgeny Klochikhin, Alexandria, VA (US); Paul Balzer, Freital (DE); Iuri Iatsinin, Tambov (RU)

(73) Assignee: PARKOFON INC., Vienna, VA (US)

( * ) Notice: Subject to any disclaimer, the term of this patent is extended or adjusted under 35 U.S.C. 154(b) by 369 days.

(21) Appl. No.: 17/586,439

(22) Filed: Jan. 27, 2022

(65) Prior Publication Data

US 2023/0236324 A1     Jul. 27, 2023

(51) Int. Cl.
| | |
|---|---|
| *G01S 19/05* | (2010.01) |
| *G01S 19/01* | (2010.01) |
| *G06Q 20/32* | (2012.01) |
| *H04B 17/318* | (2015.01) |
| *H04W 64/00* | (2009.01) |

(52) U.S. Cl.
CPC ............ *G01S 19/05* (2013.01); *G01S 19/015* (2013.01); *G06Q 20/3224* (2013.01); *H04B 17/318* (2015.01); *H04W 64/006* (2013.01)

(58) Field of Classification Search
CPC ........ G01S 19/05; G01S 19/015; G01S 5/017; G01S 19/14; G01S 19/49; G06Q 20/3224; G06Q 2240/00; G06Q 20/145; G06Q 20/401; G06Q 20/4015; G06Q 30/06; H04B 17/318; H04W 64/006; Y02T 10/70; Y02T 10/7072; Y02T 90/12
See application file for complete search history.

(56) References Cited

U.S. PATENT DOCUMENTS

| | | | |
|---|---|---|---|
| 1,535,601 | A | 6/1924 | Graham |
| 2,567,785 | A | 1/1948 | Rieger |

(Continued)

FOREIGN PATENT DOCUMENTS

| | | |
|---|---|---|
| AU | 2016203495 A1 | 12/2016 |
| GB | 2540413 A | 1/2017 |

OTHER PUBLICATIONS

International Search Report and Written Opinion dated Jul. 26, 2018, International Application No. PCT/US18/30062, pp. 1-10.

(Continued)

*Primary Examiner* — Lester G Kincaid
*Assistant Examiner* — Abdullah Al Mamun
(74) *Attorney, Agent, or Firm* — Resolute Legal PLLC

(57) ABSTRACT

The various systems and methods disclosed herein provide for a secure, cost effective, and high accuracy location detection. In some implementations of the system and method for high accuracy location detection, a mobile location device obtains and calculates location data from a plurality of sources without requiring expensive and power inefficient processors. In some implementations, such secure, cost effective, and high accuracy location detection by the mobile location device is used in improved vehicle based transactions, such as energy dispensing and payment management systems and methods. In some such implementations, the mobile location device communicates with remote geomapping servers and payment systems to provide automated vehicle based transactions, such as energy dispensing sessions and payment.

32 Claims, 20 Drawing Sheets

(56) References Cited

U.S. PATENT DOCUMENTS

| | | | |
|---|---|---|---|
| 3,382,734 A | 9/1966 | Hussey | |
| 3,807,255 A | 4/1974 | Baginski | |
| 4,103,563 A | 8/1978 | Genzling | |
| 4,373,760 A | 2/1983 | Durham | |
| 4,882,946 A | 11/1989 | Beyl | |
| 4,893,523 A | 1/1990 | Lennon | |
| 4,898,048 A | 2/1990 | Sampson | |
| 4,936,164 A | 6/1990 | Forke | |
| 4,969,373 A | 11/1990 | Good | |
| 5,490,073 A | 2/1996 | Kyrtsos | |
| 5,549,396 A | 8/1996 | Chiang | |
| 5,727,429 A | 3/1998 | Ueda | |
| 5,755,144 A | 5/1998 | Ueda | |
| 5,992,266 A | 11/1999 | Heim | |
| 6,081,206 A | 6/2000 | Kielland | |
| 6,081,230 A | 6/2000 | Hoshino et al. | |
| 6,114,990 A | 9/2000 | Bergljung et al. | |
| 6,205,885 B1 | 3/2001 | Hermansen et al. | |
| 6,282,984 B1 | 9/2001 | Chen | |
| 6,393,940 B1 | 5/2002 | Ueda | |
| 6,493,676 B1 | 12/2002 | Levy | |
| 6,543,309 B2 | 4/2003 | Heim | |
| 6,647,826 B2 | 11/2003 | Okajima et al. | |
| 6,925,908 B2 | 8/2005 | Muraoka | |
| 7,174,807 B2 | 2/2007 | Bryne | |
| 7,188,070 B2 | 3/2007 | Dar et al. | |
| 7,215,255 B2 | 5/2007 | Grush | |
| 7,515,917 B2 | 4/2009 | Casey | |
| 8,063,797 B1 | 11/2011 | Sonnabend et al. | |
| 8,065,074 B1 | 11/2011 | Liccardo | |
| 8,065,179 B1 | 11/2011 | Karnik | |
| 8,131,596 B2 | 3/2012 | McQuilken | |
| 8,140,265 B2 | 3/2012 | Grush | |
| 8,175,886 B2 | 5/2012 | Odinak | |
| 8,250,366 B2 | 8/2012 | Longobardi et al. | |
| 9,123,034 B2 | 9/2015 | Rydbeck et al. | |
| 9,135,821 B2 | 9/2015 | Levy et al. | |
| 9,418,550 B2 | 8/2016 | Geelen | |
| 9,558,665 B2 | 1/2017 | Wang | |
| 9,704,392 B2 | 7/2017 | Wang | |
| 9,924,320 B1 | 3/2018 | Rajagopal et al. | |
| 9,971,998 B2 | 5/2018 | Nuzzi | |
| 9,972,201 B2 | 5/2018 | Wang | |
| 10,024,977 B1 | 7/2018 | Schneider et al. | |
| 10,062,061 B2 | 8/2018 | Wang et al. | |
| 10,192,440 B2 | 1/2019 | Hohenacker | |
| 10,275,948 B2 | 4/2019 | Wang | |
| 10,395,535 B2 | 8/2019 | Wang | |
| 10,438,250 B2 | 10/2019 | Yamashiro et al. | |
| 10,482,441 B1 | 11/2019 | Watson et al. | |
| 10,891,806 B1 | 1/2021 | Chaudhuri | |
| 10,957,199 B2 | 3/2021 | Reaser | |
| 11,010,988 B2 | 5/2021 | Levy et al. | |
| 11,488,471 B2 | 11/2022 | Neff et al. | |
| 2002/0008639 A1 | 1/2002 | Dee | |
| 2003/0146852 A1 | 8/2003 | O'Dell | |
| 2004/0057540 A1 | 3/2004 | Naberfeld | |
| 2004/0181439 A1 | 9/2004 | Kakuta et al. | |
| 2005/0252337 A1 | 11/2005 | Chen | |
| 2005/0286421 A1 | 12/2005 | Janacek | |
| 2006/0227010 A1 | 10/2006 | Berstis et al. | |
| 2006/0238415 A1 | 10/2006 | Gilkes | |
| 2007/0016362 A1 | 1/2007 | Nelson | |
| 2007/0213933 A1 | 9/2007 | Zeng et al. | |
| 2008/0147410 A1 | 6/2008 | Odinak | |
| 2009/0030605 A1 | 1/2009 | Breed | |
| 2009/0241725 A1 | 10/2009 | Chen | |
| 2009/0248577 A1 | 10/2009 | Hoj | |
| 2009/0292597 A1 | 11/2009 | Schwartz et al. | |
| 2010/0064845 A1 | 3/2010 | French | |
| 2011/0153367 A1 | 6/2011 | Amigo et al. | |
| 2011/0202754 A1 | 8/2011 | Waters et al. | |
| 2012/0056758 A1 | 3/2012 | Kuhlman et al. | |
| 2012/0092190 A1 | 4/2012 | Stefik et al. | |
| 2012/0130777 A1 | 5/2012 | Kaufman | |
| 2012/0218122 A1 | 8/2012 | Bogaard | |
| 2012/0265434 A1 | 10/2012 | Woodard et al. | |
| 2013/0275303 A1 | 10/2013 | Fiore et al. | |
| 2013/0282448 A1 | 10/2013 | Rydbeck et al. | |
| 2013/0297551 A1 | 11/2013 | Smith et al. | |
| 2014/0040028 A1 | 2/2014 | King et al. | |
| 2014/0156183 A1 | 6/2014 | Windeler et al. | |
| 2014/0232569 A1 | 8/2014 | Skinder et al. | |
| 2014/0249742 A1 | 9/2014 | Krivacic et al. | |
| 2014/0310073 A1 | 10/2014 | Bulan et al. | |
| 2014/0372185 A1 | 12/2014 | Ganot | |
| 2014/0379442 A1 | 12/2014 | Dutta et al. | |
| 2015/0025947 A1 | 1/2015 | Dutta et al. | |
| 2015/0039220 A1 | 2/2015 | Georgy et al. | |
| 2015/0051833 A1 | 2/2015 | Geelen | |
| 2015/0057028 A1 | 2/2015 | Rudow et al. | |
| 2015/0087264 A1 | 3/2015 | Goyal | |
| 2015/0170031 A1 | 6/2015 | Attar et al. | |
| 2015/0317840 A1 | 11/2015 | Dutta et al. | |
| 2016/0012726 A1 | 1/2016 | Wang | |
| 2016/0125736 A1 | 5/2016 | Shaik | |
| 2016/0163119 A1 | 6/2016 | Bashani | |
| 2016/0284137 A1 | 9/2016 | Levy et al. | |
| 2017/0074659 A1 | 3/2017 | Giurgiu et al. | |
| 2017/0206471 A1 | 7/2017 | Dermosissian | |
| 2017/0243418 A1 | 8/2017 | Outwater et al. | |
| 2017/0318149 A1 | 11/2017 | Daoud | |
| 2017/0323227 A1 | 11/2017 | Sadeghi | |
| 2017/0358208 A1* | 12/2017 | Kazemi | G08G 1/144 |
| 2018/0121833 A1 | 5/2018 | Friedman et al. | |
| 2018/0194344 A1 | 7/2018 | Wang et al. | |
| 2018/0213355 A1* | 7/2018 | Smith | H04W 84/18 |
| 2018/0215380 A1 | 8/2018 | Devi | |
| 2018/0285657 A1 | 10/2018 | Koreishi | |
| 2018/0315313 A1 | 11/2018 | Klochikhin et al. | |
| 2019/0019407 A1 | 1/2019 | Nakhjavani | |
| 2019/0066505 A1 | 2/2019 | Salvucci et al. | |
| 2020/0077231 A1 | 3/2020 | Sworski et al. | |
| 2020/0088528 A1 | 3/2020 | Mishra | |
| 2020/0225365 A1* | 7/2020 | Hasberg | G01C 21/30 |
| 2020/0242935 A1 | 7/2020 | Nagata et al. | |
| 2020/0302421 A1 | 9/2020 | Stickels et al. | |
| 2020/0340814 A1 | 10/2020 | Ma et al. | |
| 2020/0346553 A1* | 11/2020 | Grimm | B60L 53/65 |
| 2020/0370890 A1* | 11/2020 | Hamilton | G08G 1/04 |
| 2021/0048541 A1 | 2/2021 | Miller et al. | |
| 2021/0215485 A1* | 7/2021 | Ishigami | G01S 19/52 |
| 2021/0366283 A1 | 11/2021 | Klochikhin et al. | |
| 2022/0014949 A1* | 1/2022 | Barbu | G01S 5/021 |
| 2022/0020229 A1* | 1/2022 | Higgins | H04L 67/52 |
| 2023/0090051 A1 | 3/2023 | Hassani et al. | |
| 2023/0300579 A1 | 9/2023 | Merwaday et al. | |

OTHER PUBLICATIONS

International Preliminary Search Report on Patentability dated Nov. 14, 2019, International Application No. PCT/US18/30062, pp. 1-10.

Allison Kealy et al., "MEMS and wireless options: User localization in cellular phones", ION Pacific PNT Conference, May 2017, pp. 1-8.

Gerard Lachapelle, "GNSS Indoor Location Technologies", The 2004 International Symposium on GNSS/GPS, Dec. 2004, pp. 1-15.

Sameh Nassar et al., "Improving MEMS IMU/GPS Systems for Accurate Land-Based Navigation Applications", ION NTM 2006, January 2206, pp. 1-7.

ParkWhiz, "Find Available Parking on Your Mobile Phone", Retrieved from the Internet Apr. 3, 2008: http://www.parking-net.com/parking-news/find-available-parking-on-your-mobile-phone, pp. 1-3.

Paul Balzer et al., "EPE and Speed Adaptive Extended Kalman Filter for Vehicle Position and Attitude Estimation with Low Cost GNSS and IMU Sensors," 2014 11th International Conference on Informatics in Control, Automation and Robotics (ICINCO). vol. 1. IEEE, 2014, pp. 649-656.

Partial European Search Report dated Mar. 17, 2022, European Application No. 18794925.0, pp. 1-12.

PCT International Search Report and Written Opinion dated May 10, 2023, PCT International Application No. PCT/US23/11540, pp. 1-27.

(56) References Cited

OTHER PUBLICATIONS

PCT International Search Report and Written Opinion dated Jul. 7, 2023, PCT International Application No. PCT/US23/18473, pp. 1-16.

* cited by examiner

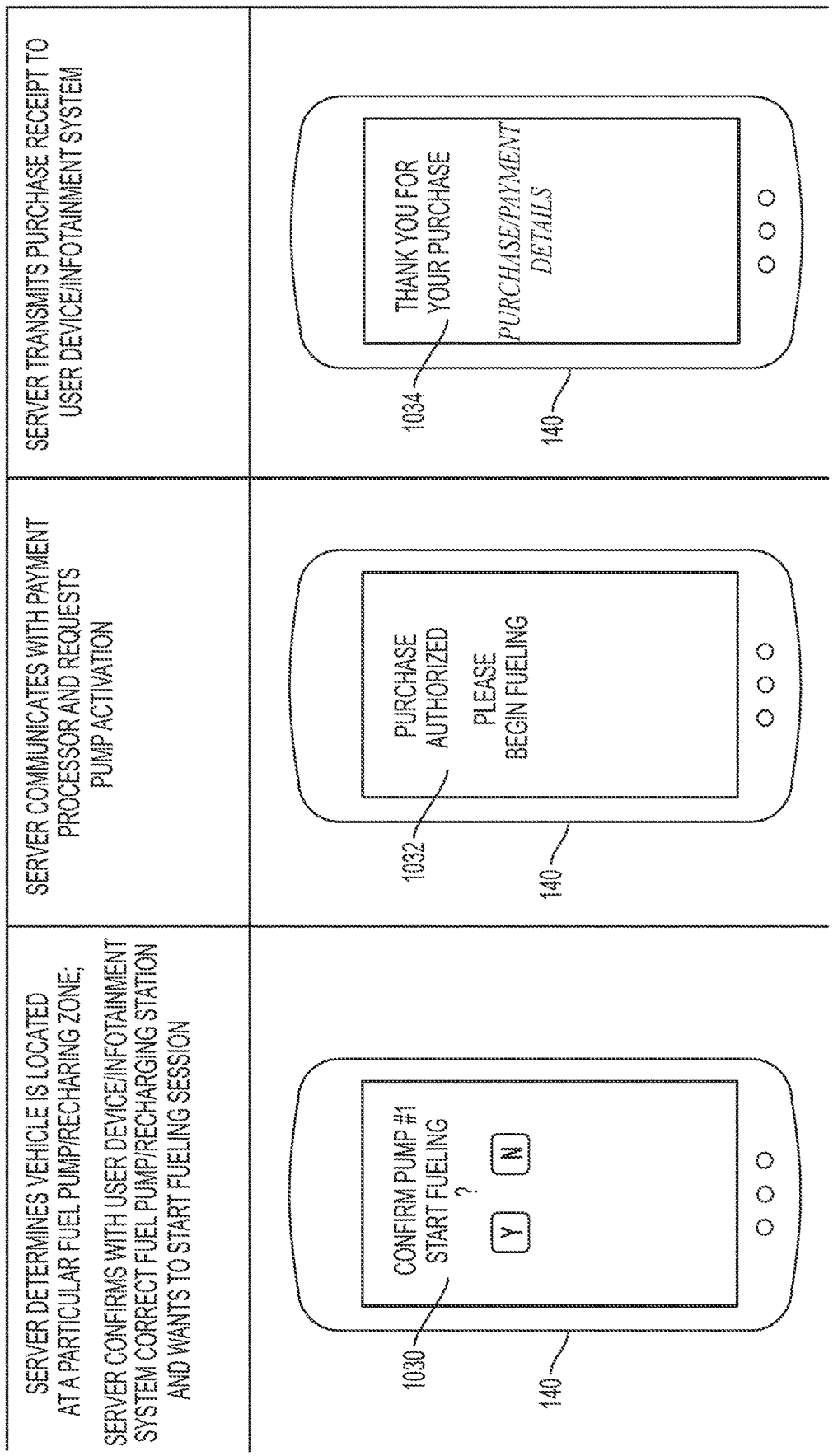

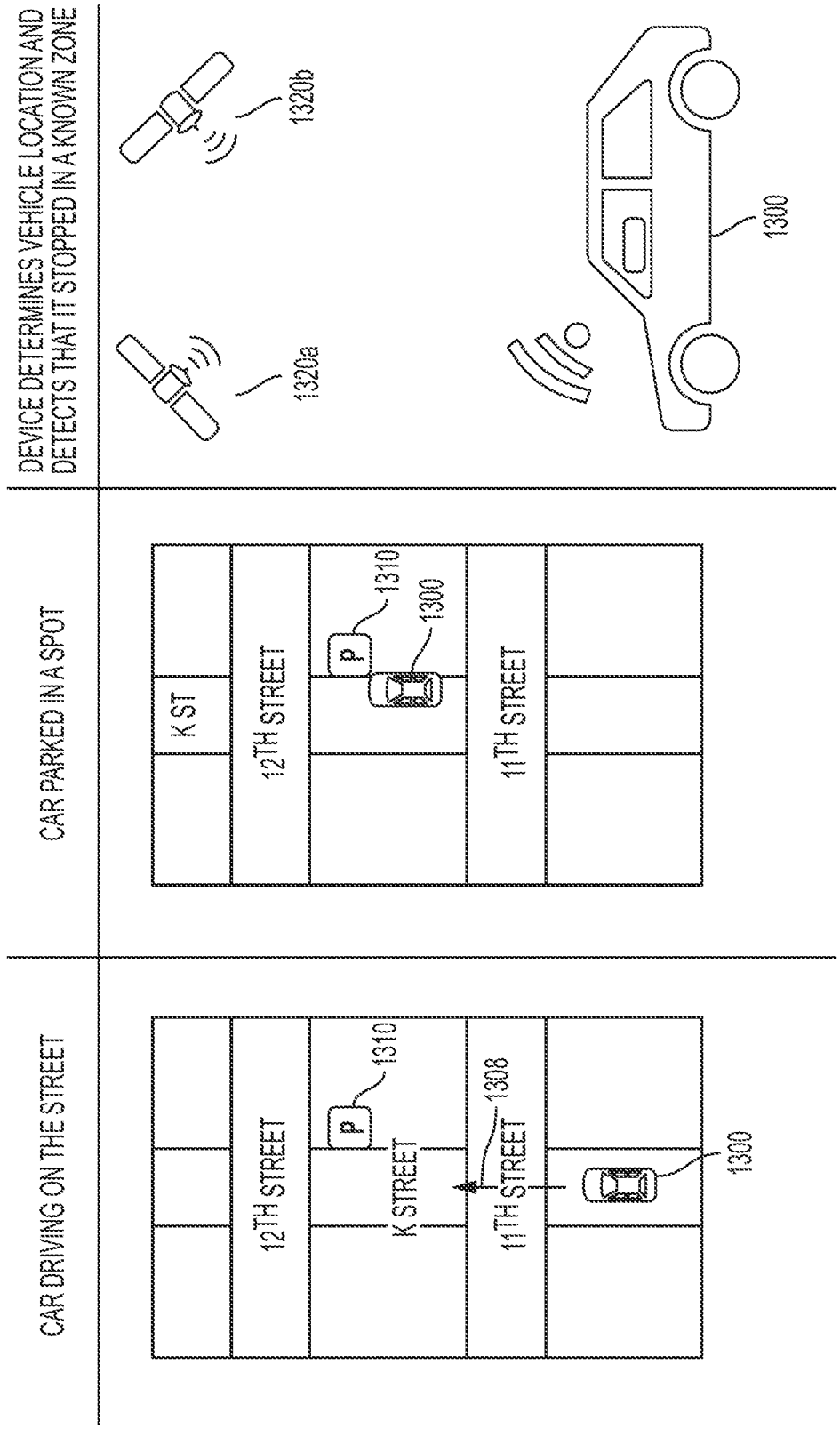

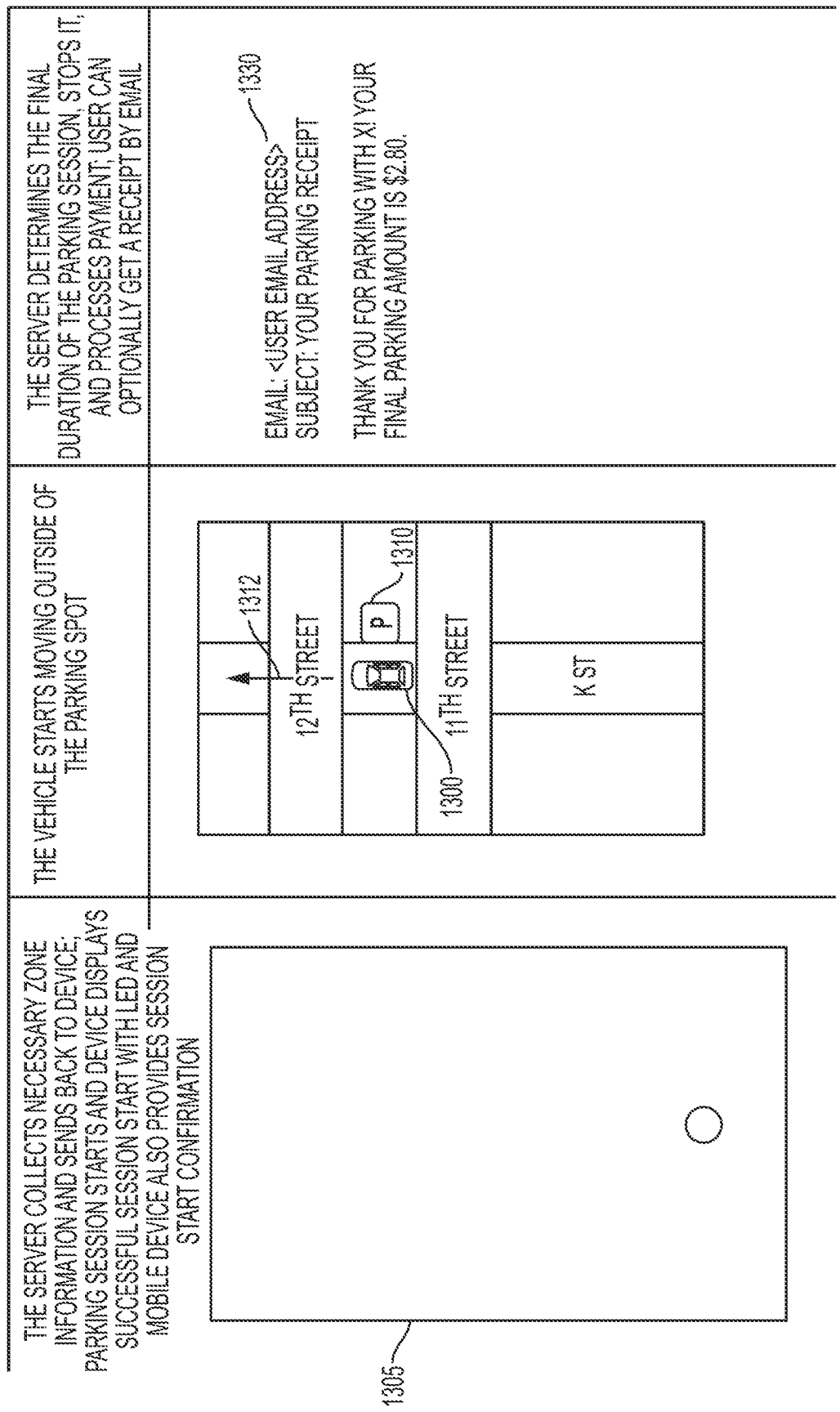

SYSTEM AND METHOD FOR HIGH ACCURACY LOCATION DETERMINATION AND ENERGY DISPENSING

FIELD OF THE DISCLOSURE

The present disclosure relates to the fields of high accuracy location determination, cashless energy dispensing, wireless payment for energy dispensing, remote management and control of energy dispensing, and intelligent transportation systems more generally.

SUMMARY

The various systems and methods disclosed herein provide for a secure, cost effective, efficient, and high accuracy location detection. In some implementations of the system and method for high accuracy location detection, a mobile location device obtains and calculates accurate location data from a plurality of sources such as global navigation satellite systems (GNSS), microelectromechanical systems (MEMS), and geographic information systems (GIS) without requiring expensive and power inefficient processors to read raw GNSS data.

In some implementations, such secure, cost effective, and high accuracy location detection by the mobile location device can be applied for use in improved energy dispensing, parking, tolling, and payment management systems and methods. In some such implementations, the mobile location device further communicates with remote geomapping servers and payment systems to provide automated vehicle based transactions such as energy dispensing, parking, tolling, and payment.

In some aspects, the techniques described herein relate to a location device including: a processor; and a memory device that stores a plurality of instructions, which when executed by the processor, causes the processor to be configured to: receive, global navigation satellite systems (GNSS) data and vehicle motion data, wherein the GNSS data and the vehicle motion data are associated with a vehicle; calculate, in an estimation filter operating in a first mode, a location of the vehicle based on the GNSS data and the vehicle motion data; determine that a velocity of the vehicle is below a threshold velocity; alter the estimation filter to operate in a second mode based on the velocity being below the threshold velocity; calculate, in the estimation filter operating in the second mode, a position location of the vehicle, wherein at least some of the GNSS data and the vehicle motion data is altered for the estimation filter to determine the position location of the vehicle; transmit the position location of the vehicle to a geomapping server enabling a vehicle based transaction.

In some aspects, the techniques described herein relate to a location device, wherein the alteration of the at least some of the GNSS data and the vehicle motion data results in data for the vehicle velocity being altered.

In some aspects, the techniques described herein relate to a location device, wherein the alteration of the at least some of the GNSS data and the vehicle motion data results in data for a vehicle yaw rate being altered.

In some aspects, the techniques described herein relate to a location device, wherein the processor is further configured to calculate and capture a plurality of location points when the estimation filter is operating in the second mode.

In some aspects, the techniques described herein relate to a location device, wherein the velocity of the vehicle is a first velocity value received in the GNSS data and the processor is further configured: receive, in the GNSS data, one or more signal strength indicators; determine from the one or more signal strength indicators not to use the first velocity value; and calculate a second velocity value based at least in part on the vehicle motion data.

In some aspects, the techniques described herein relate to a location device, wherein the second velocity value is calculated at least in part using vehicle acceleration data from the vehicle motion data.

In some aspects, the techniques described herein relate to a location device, wherein the estimation filter is a Kalman filter, and wherein the Kalman filter includes a plurality of modes.

In some aspects, the techniques described herein relate to a location device, wherein the vehicle based transaction is triggered based on the position location being in a predetermined location and the vehicle based transaction is an energy dispensing session at an energy dispensing device.

In some aspects, the techniques described herein relate to a location device, wherein the processor is further configured to enable the energy dispensing session at the energy dispensing device using a two-factor authentication, wherein a first authentication factor is based at least in part on the transmitted position location, and a second authentication factor is based at least in part on a communication from a user device.

In some aspects, the techniques described herein relate to a location device, wherein the communication from a user device confirms the energy dispensing device.

In some aspects, the techniques described herein relate to a location device, wherein the energy dispensing device is a first energy dispensing device and the communication from a user device confirms a second energy dispensing device.

In some aspects, the techniques described herein relate to a location device, wherein the energy dispensing device is a fuel pump.

In some aspects, the techniques described herein relate to a location device, wherein the energy dispensing device is an electric vehicle charger.

In some aspects, the techniques described herein relate to a location device, wherein the vehicle based transaction is triggered based on the position location being in a predetermined location and the vehicle based transaction is a parking session.

In some aspects, the techniques described herein relate to a location device, wherein the predetermined location is a legal parking zone.

In some aspects, the techniques described herein relate to a location device, wherein the plurality of instructions further cause the processor to: determine that the vehicle is moving faster than a predetermined speed; transmit to the geomapping server a message indicating that the vehicle is moving faster than the predetermined speed; and cause the parking session to end based on the transmitted message.

In some aspects, the techniques described herein relate to a location device, wherein the vehicle based transaction is a toll transaction that automates a toll payment based on the position location of the vehicle.

In some aspects, the techniques described herein relate to a method for processing vehicle location including: receiving, global navigation satellite systems (GNSS) data and vehicle motion data, wherein the GNSS data and the vehicle motion data are associated with a vehicle; calculating, in an estimation filter operating in a first mode, a location of the vehicle based on the GNSS data and the vehicle motion data; determining that a velocity of the vehicle is below a threshold velocity; altering the estimation filter to operate in a second mode based on the velocity being below the threshold velocity; calculating, in the estimation filter operating in the second mode, a position location of the vehicle, wherein at least some of the GNSS data and the vehicle motion data is altered for the estimation filter to determine the position location of the vehicle; transmitting the position location of the vehicle to a geomapping server enabling a vehicle based transaction.

In some aspects, the techniques described herein relate to a method, wherein the alteration of the at least some of the GNSS data and the vehicle motion data results in data for the vehicle velocity being altered.

In some aspects, the techniques described herein relate to a method, wherein the alteration of the at least some of the GNSS data and the vehicle motion data results in data for a vehicle yaw rate being altered.

In some aspects, the techniques described herein relate to a method, further including, calculating and capturing a plurality of location points when the estimation filter is operating in the second mode.

In some aspects, the techniques described herein relate to a method, wherein the velocity of the vehicle is a first velocity value received in the GNSS data, the method further including: receiving, in the GNSS data, one or more signal strength indicators; determining from the one or more signal strength indicators not to use the first velocity value; and calculating a second velocity value based at least in part on the vehicle motion data.

In some aspects, the techniques described herein relate to a method, wherein the second velocity value is calculated at least in part using vehicle acceleration data from the vehicle motion data.

In some aspects, the techniques described herein relate to a method, wherein the estimation filter is a Kalman filter, and wherein the Kalman filter includes a plurality of modes.

In some aspects, the techniques described herein relate to a method, wherein the vehicle based transaction is triggered based on the position location being in a predetermined location and the vehicle based transaction is an energy dispensing session at an energy dispensing device.

In some aspects, the techniques described herein relate to a method, further including, enabling the energy dispensing session at the energy dispensing device using a two-factor authentication, wherein a first authentication factor is based at least in part on the transmitted position location, and a second authentication factor is based at least in part on a communication from a user device.

In some aspects, the techniques described herein relate to a method, wherein the communication from a user device confirms the energy dispensing device.

In some aspects, the techniques described herein relate to a method, wherein the energy dispensing device is a first energy dispensing device and the communication from a user device confirms a second energy dispensing device.

In some aspects, the techniques described herein relate to a method, wherein the energy dispensing device is a fuel pump.

In some aspects, the techniques described herein relate to a method, wherein the energy dispensing device is an electric vehicle charger.

In some aspects, the techniques described herein relate to a method, wherein the vehicle based transaction is triggered based on the position location being in a predetermined location and the vehicle based transaction is a parking session.

In some aspects, the techniques described herein relate to a method, wherein the predetermined location is a legal parking zone.

In some aspects, the techniques described herein relate to a method, further including: determining that the vehicle is moving faster than a predetermined speed; transmitting to the geomapping server a message indicating that the vehicle is moving faster than the predetermined speed; and causing the parking session to end based on the transmitted message.

In some aspects, the techniques described herein relate to a method, wherein the vehicle based transaction is a toll transaction that automates a toll payment based on the position location of the vehicle.

BRIEF DESCRIPTION OF THE DRAWINGS

FIGS. 10A, 10B, 10C, 10D, 10E, and 10F are illustrations of an example implementation of automating an energy dispensing session based on vehicle location data.

FIGS. 13A, 13B, 13C, 13D, 13E, and 13F are illustrations of an example implementation of starting a parking session for a vehicle in a legal parking zone and then stopping the parking session when the vehicle leaves the parking zone.

DETAILED DESCRIPTION

The disclosure herein provides various implementations of secure, cost effective, efficient, and high accuracy location detection systems from which those skilled in the art shall appreciate various novel approaches and features developed by the inventors. These various novel approaches and features, as they may appear herein, may be used individually, or in combination with each other, as desired.

In particular, the implementations described, and references in the specification to "one implementation", "an implementation", "an example implementation", etc., indicate that the implementation(s) described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, persons skilled in the art may implement such feature, structure, or characteristic in connection with other implementations whether or not explicitly described.

Figure 1:
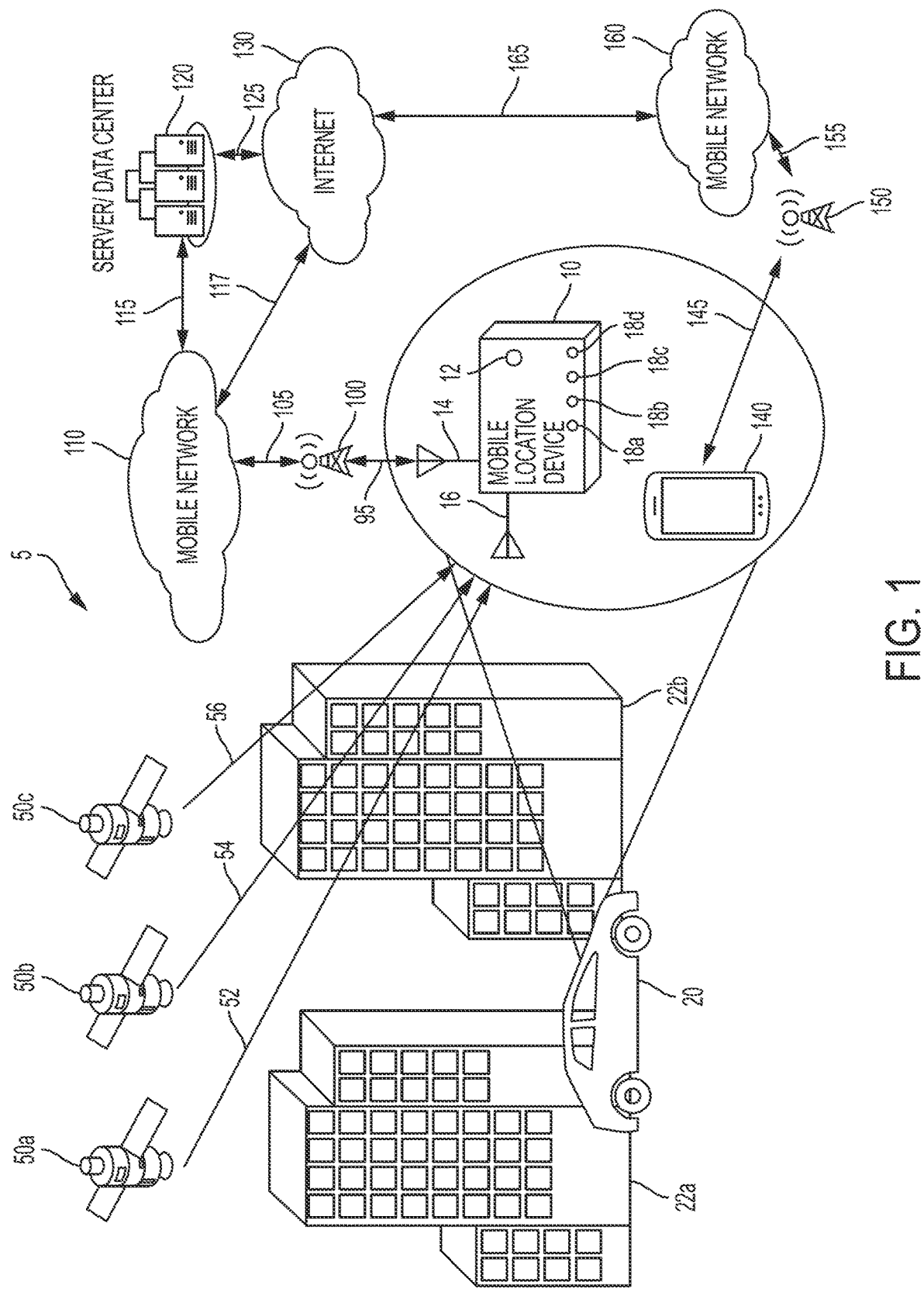
FIG. 1 is a perspective view of some implementations of a vehicle having a mobile location device that is in communication with numerous different systems to determine the location of the vehicle with a high degree of accuracy.

FIG. 1 is a perspective view of some implementations of a location system 5 that provides low cost, high accuracy location detection. The location system 5 includes a mobile location device 10. In some implementations, mobile location device 10 can comprise a one or more location processors that can determine a location of the mobile location device 10 within a few meters of accuracy within a geographic area. In some implementations, the location accuracy is within four meters or less of accuracy. However, other suitable levels of accuracy may be achieved. The mobile location device 10 can determine a location using one or more sources of location data. In some implementations, the mobile location device 10 may comprise a user interface such as at least one indicator light 12 and a plurality of user interface buttons 18a-18b. Mobile location device 10 comprises antennas 14 and 16, wherein in some implementations, the antennas are not visible and are contained within the mobile location device 10. It should be appreciated that the mobile location device 10 may comprise more indicator lights or no indicator lights; fewer, no or more user interface buttons; and fewer or more antennas. Mobile location device 10 may include a user interface screen (not shown) in some implementations. Mobile location device 10 may include other features as discussed below. Mobile location device 10 may be placed in a vehicle 20. The mobile location device 10 is configured to work in a variety of different locations, including "urban canyons" created when mobile location device 10 and vehicle 20 pass through cities and are surrounded by buildings such as building 22a and 22b. These "urban canyons" create multipath signal distortions that previously made it difficult to resolve locations of Global Navigation Satellite System (GNSS) receivers/processors (GNSS units) absent extremely expensive hardware solutions that require excessive amounts of power.

Mobile location device 10, as shown in FIG. 1, is in communication with a plurality of different devices and systems to aid in detecting the location (i.e., geographic position) of mobile location device 10. In some implementations, mobile location device 10 is in communication with a plurality of different satellite systems, such as satellite system 50a, satellite system 50b, and satellite system 50c. Mobile location device 10 may receive location signal 52 from satellite system 50a; location signal 54 from satellite system 50b; and location signal 56 from satellite system 50c through antenna 16. Satellite system 50a may comprise a global positioning system (GPS) satellite system, which comprises a plurality of satellites. Satellite system 50b may comprise a Global Orbiting Navigation Satellite System (GLONASS), which comprises a plurality of satellites. Satellite system 50c may comprise a Galileo satellite system, which comprises a plurality of satellites. It should be appreciated that in some implementations, mobile location device 10 may receive signals from fewer satellite systems (e.g., satellite system 50a, but not other satellite systems 50b and 50c). In other implementations, mobile location device 10 may receive signals from more satellite systems than illustrated. In some implementations, where mobile location device 10 is unable to receive satellite signals, mobile location device 10 may not receive signals from any satellite. In some implementations, the mobile location device 10 is a self-contained unit that includes one or more of the modules discussed in FIG. 3 (e.g., geolocation positioning system 320, MEMS system 330, etc.). In some implementations, the mobile location device 10 as a self-contained unit, can be removably installed in a vehicle, similar to toll transponders. In some implementations, mobile location device 10 may have access to one or more sensors in a vehicle. In some implementations where mobile location device 10 has access to one or more sensors in a vehicle (e.g., through the vehicle's CAN bus), the mobile location device 10 may not include one or more of the modules discussed in FIG. 3 because these modules are already provided by the vehicle. While mobile location device 10 is described above a comprising multiple different components and described as a separate system from a vehicle, in some implementations, the mobile location device 10 is an embedded system in a vehicle and can obtain data from one or more of the vehicle sensors. As an embedded system, one or more functions of the vehicle motion device 10, including functions of the processor 310, can be integrated into existing vehicle systems.

Mobile location device 10 may communicate through antenna 14 with a mobile network 110 through one or more cellular access points 100 via communication link 95. Cellular access points 100 may communicate with the mobile network 110 via communication link 105. It should be appreciated that mobile network 110 may include hundreds or thousands of cellular access points 100 and communication links 105 to provide access to the mobile network 110. In some implementations, through the mobile network 110, the mobile location device 10 may communicate via communication link 117 with one or more servers and databases in data center 120. In some implementations, through the mobile network 110, the mobile location device 10 may communicate via communication link 115 with one or more servers and databases in data center 120. Such servers may be described as geomapping servers herein. In some implementations, system 5 may include a plurality of different data centers spread throughout a particular country or throughout the world to ensure that mobile location device 10 has access to smooth and low latency communication to location services provided by servers in data center 120. In some implementations, mobile network 110 provides a secure connection between mobile location device 10 and servers in data center 120. In some implementations, the secure connection can be a virtual private network (VPN). However, other suitable secure connections can be used for mobile location device 10 to communicate with the servers in data center 120. In some implementations, the communications between mobile location device 10 and servers in data center 120 are not secure. It should be appreciated that in some implementations, mobile location device 10 may also access other servers or endpoints that are in communication with mobile network 110. In some implementations, the system 5 may include a plurality of different mobile networks 110. In some implementations, the plurality of different mobile networks are located in different countries. In other implementations, some of the plurality of different mobile networks are located in the same country. In some implementations, mobile network 110 is a mobile virtual network (MVN). The mobile network 110 may be created as a virtual network that communicates over one or more other mobile networks. For example, the mobile network 110 may be formed using connectivity over a first GSM based mobile network and a second different GSM based mobile network. When a mobile location device 10 moves between a first GSM based mobile network and a second different GSM based mobile network, the transition and the data transmitted over the two different GSM based mobile networks is seamlessly routed to the same place, creating a virtual mobile network.

Mobile location device 10 may communicate through mobile network 110 with the Internet 130. Mobile network 110 may have one or more links to the Internet 130, such as link 117, which permit mobile location device 10 to communicate with endpoints on the Internet 130. In some implementations, mobile location device 10 may access services from endpoints on the Internet 130 (not shown). For example, mobile location device 10 may access GPS correction data from a server accessible through the Internet 130. Mobile location device 10 may access other suitable services through Internet 130. In some implementations, servers in data center 120 may also communicate with endpoints through Internet 130 via communication links 125.

Location system 5 also illustrates a user device 140. User device 140 may be a mobile phone, smartphone or other suitable computer system, such as for example, a laptop computer, a tablet device or a smartwatch. In some implementations, user device 140 may be a vehicle infotainment system comprised by vehicle 20. In some implementations, the user device 140 of system 5 can be a combination of more than one device, for example, user device 140 may include a smartphone and an infotainment system; or, as another example, user device 140 may include a smartphone, an infotainment system, and a smartwatch (not shown). In some implementations, the functions of the mobile location device 10 and the user device 140 can be integrated into one device. The user device 140 is associated with the mobile location device 10. The servers in data center 120 store the association between the user device 140 and the mobile location device 10. The user device 140 may be in communication with one or more servers in data center 120 to access certain services. In some implementations, user device 140 may be configured with an application to access information about mobile location device 10 and various services, such as refueling, recharging, parking, tolling, curbside pickup, and the like. User device 140 may communicate with a mobile network 160 through one or more cellular access points 150 via communication link 145. Cellular access points 150 may communicate with the mobile network 160 via one or more communication links 155. It should be appreciated that mobile network 160 may include hundreds or thousands of cellular access points 150 and communication links 145 to provide access to the mobile network 160. Through the mobile network 160, the user device 140 may communicate via communication link 165 with one or more servers in data center 120. As noted above, a plurality of different data centers 120 may be used to provide services to user device 140. In some implementations, the mobile network 160 and mobile network 110 can be the same mobile network, depending on the geographic location of the mobile location device 10 and the user device 140, and service arrangements among the networks 110 and 160, and devices 10 and 140.

While not shown, mobile location device 10 may also directly communicate with user device 140. In some implementations, the communication may occur over a short range wireless link such as Bluetooth or via hardwired links such as universal serial bus (USB) or Ethernet.

In various implementations, communication links noted herein can comprise hardwire or wireless communication links. It should be appreciated that not all communication links and network nodes used to form the illustrated communication links are shown in FIG. 1 or other figures.

It should be appreciated that methods of communications of system 5 are not limited to the various systems and networks shown in FIG. 1. Mobile location device 10 may be in communication with any other suitable number of networks and through any other suitable communication links.

Figure 2A:
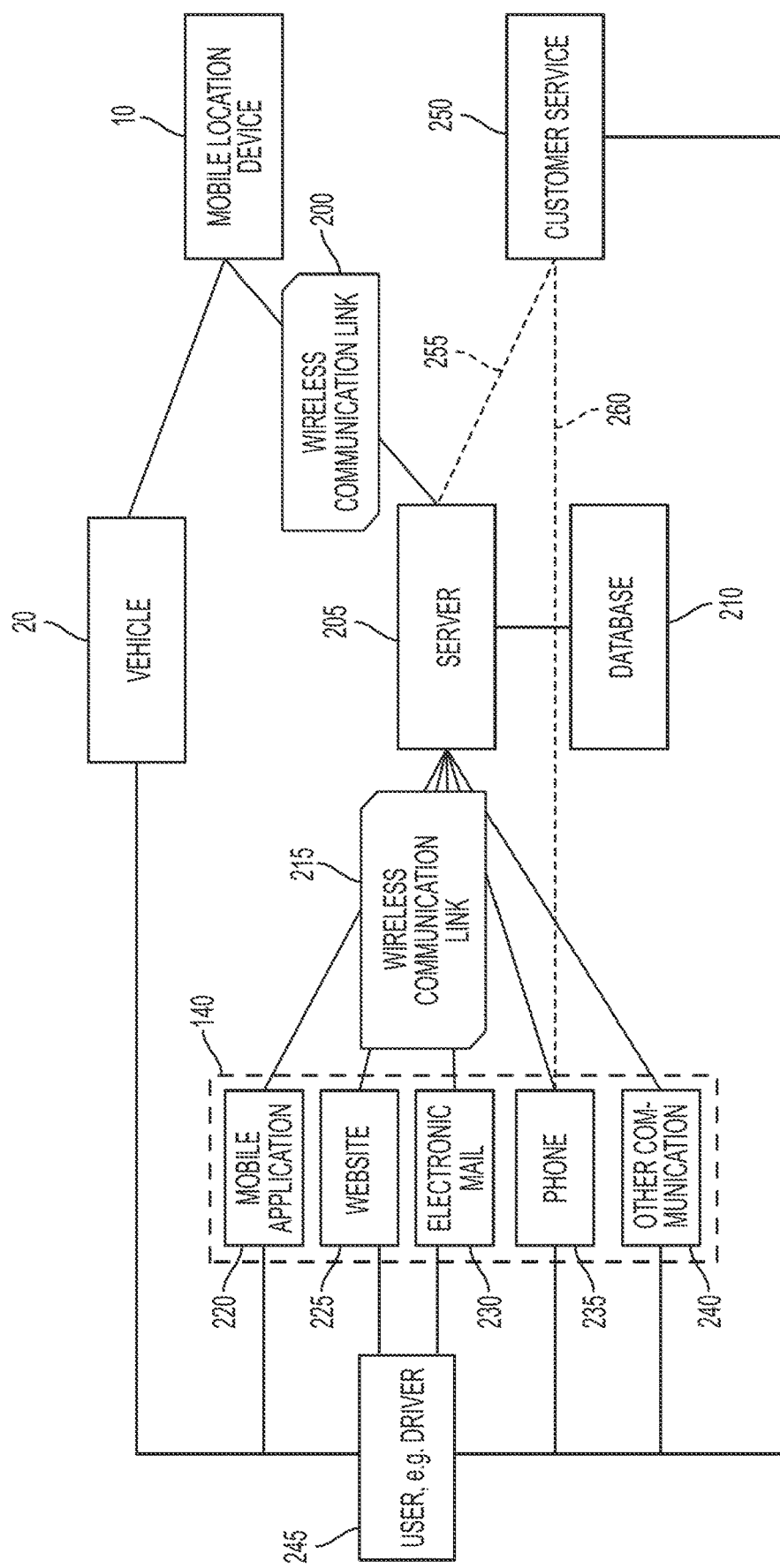
FIG. 2A is a block schematic diagram of the disclosed system and communication patterns between its different elements, including the device, the server (or multiple servers), the database (or multiple databases), and the user (through a mobile application or other means of communication, possibly including the vehicle display screen) in some implementations.

FIG. 2A is a block schematic diagram illustrating some implementations of the high accuracy location system for vehicle based transaction services such as parking and/or automated energy dispensing and payment, and possible links between its elements. The user 245, e.g., an individual driver or a company managing a corporate fleet, uses a vehicle 20 (or vehicles), which may be owned, rented, or used for employment and business operations. The mobile location device 10 may be placed in or comprised by the vehicle 20. A database 210 may store geographical objects or zones that comprise geographical coordinates of locations like legal parking zones, of zones adjacent to fuel pumps, charging stations, toll plazas, curb side pickup locations, and the like. In some implementations, the database 210 can be located in data center 120, or one or more data centers. In some implementations, database 120 can be stored on an external memory device of the mobile location device 10, such as a memory card (e.g., SD, micro SD, Compact Flash, etc.), USB flash drive, and the like, or directly in the internal memory of the processing device, such as flash memory within mobile location device 10. In some implementations, the database contains geographic information (e.g., one or more geographical coordinates) defining a zone in terms of geolocated polygons, which may also be referred to as geolocated zones. In some implementations, such geographic zone information can be defined as a center and radius of a circle. The data in database 210 can be derived construction records, energy dispensing device installation records, traditional surveying and the like. In some implementations, the information in database 210 can be derived at least in part from satellite view images and street view images. In some implementations, a zone can be encoded or associated with additional data specific to a particular transaction. In some implementations, for a fueling station geographical object, the additional data may include, but is not limited to, fuel station entity name, fuel station address, pump number, etc. In some implementations, for a parking geographical object, the additional data may include, but is not limited to, parking lot entity name, parking lot address, parking spot number, etc. It should be appreciated that the foregoing additional data descriptions are simply examples and the additional data can include fewer or more information to aid in completing a transaction associated with a geographical object.

In one implementation, the server 205 is a computer, either a physical machine or a virtual machine instance or several machines or virtual instances united together that may be housed in a data center such as data center 120 from FIG. 1. A communication link 200 is provided between the server and other components of the system: the mobile location device 10, database 210, and the user 245 in some implementations. The communication link 200 may be a wireless communication link, a hardware communication link, or a combination of both types of communications, such as for example, the combination of links 95, 105 and 115, or the combination of links 95, 105, 117 and 125 of FIG. 1. In the illustration of FIG. 2A, the mobile location device 10 communicates location data to the server 205. In some implementations, location data may include position data, e.g., longitude and latitude coordinate data. In some implementations, location data, may include such coordinate data and additional data such as vehicle motion data (e.g., one or more of velocity, acceleration, yaw rate, heading, and the like) and data related to the acquisition of location data, such as an indicator of received GNNS signal strength (e.g., carrier to noise density ratio—which may be abbreviated as CN0, CNO, C/No and the like), satellite system related data, source of motion data (e.g., GNSS module derived motion data, sensor readings and the like). In some implementations disclosed herein, a distinction between motion data derived from GNSS signals and not originating from vehicle resident or vehicle embedded sensors may be useful. For example, GNSS data may be a source of vehicle velocity which can be called GNSS derived velocity, and be a form of GNSS derived motion data. GNSS derived velocity, for example can be a derivative of the GNSS acquired positions over time, or can be determined from Doppler frequency shifts produced by vehicle motion relative to satellite positions. In contrast to GNSS derived motion data, vehicle motion data is acquired using vehicle resident or vehicle embedded sensors, such as inertial measurement sensors used by the MEMS inertial measurement unit processor, e.g., accelerometers, gyroscopes, magnetometers and the like, or sensors used by an embedded vehicle motion detection (VMD) system, such as wheel rotation sensors, steering angle sensors, accelerometers, gyroscopes, and magnetometers, of which may or may not be included in a embedded VMD implementation, or other sensors not mentioned may be included therein. Vehicle motion data may also be referred to herein as non-GNSS motion data. In some implementations, communication of location data may occur on every location point determined by mobile location device 10, or some other data point interval or time interval (e.g., every other data point, every fifth data point, every 1 second, every 5 seconds, etc.). In some implementations, such communication may be based on a query received by the mobile location device 10 for a current location, wherein a query response may comprise one or more location data points (e.g., 5 data points, 10 data points, etc.). In some implementations, such communication may result from the occurrence of a trigger event, such as a detected velocity of zero indicating a stopped condition, or a detected velocity below a certain velocity threshold value. In some implementations, a combination of intervals, queries, trigger events and/or detected conditions may be used to initiate communication of location data. Upon receiving location data from mobile location device 10, server 205 may connect to the database 210 to retrieve relevant information about geographical objects/geographic zones which may be associated with received location data point(s), and in some implementations data associated with the user 245, the user device 140 of the user 245, the vehicle 20, and/or their service history (e.g., time of last refueling, amount of fuel received at last refueling, distance driven since last refueling, etc.). In some implementations, a service history may be used to generate a notification to user 245 via user device 140, that a refueling should be planned. In some implementations, location data received from mobile location device 10 and energy dispensing device geolocation data comprised by database 210 may be used to generate a list of possible fuel stations in a proximity to vehicle 20, which may be sent in a notification to user 245 via user device 140. In some implementations, upon a stopped condition or a velocity below a predetermined velocity threshold, and received location data corresponding to a geographic zone of an energy dispensing system (e.g., a fuel pump or a charging station), server 205 may communicate with user 245 via user device 140 to confirm that vehicle 20 is located at a particular energy dispensing device and process an energy dispensing session.

In some implementations, a user 245 can install a mobile application 220 on their user device 140. The user 245 can configure an energy dispensing management account associated with the user 245 to selectively enable receipt of energy dispensing related notifications through the mobile application 220 or other notification mechanisms via communication links 215. As noted above with other communication links, communications link 215 may be a wireless communication link, a hardware communication link, or a combination of both types of communications, such as for example, the combination of links 145, 155, 165 and 125 of FIG. 1. In some implementations, the notification mechanism may include notifications via the installed mobile application 220. In some implementations the notification mechanism may include notifications through electronic mail 230, a website 225, short message service (SMS) text 235, other means of communication 240, or some combination of the above. An entity managing energy dispensing automation system can provide a customer service function 250 that can be contacted via phone over link 260 or through link 255 via a software application to ask questions, resolve operational issues, and control the energy dispensing system. It should therefore be appreciated that in some implementations, the user 245 is able to customize the activation of their energy dispensing sessions and communication settings.

Figure 2B:
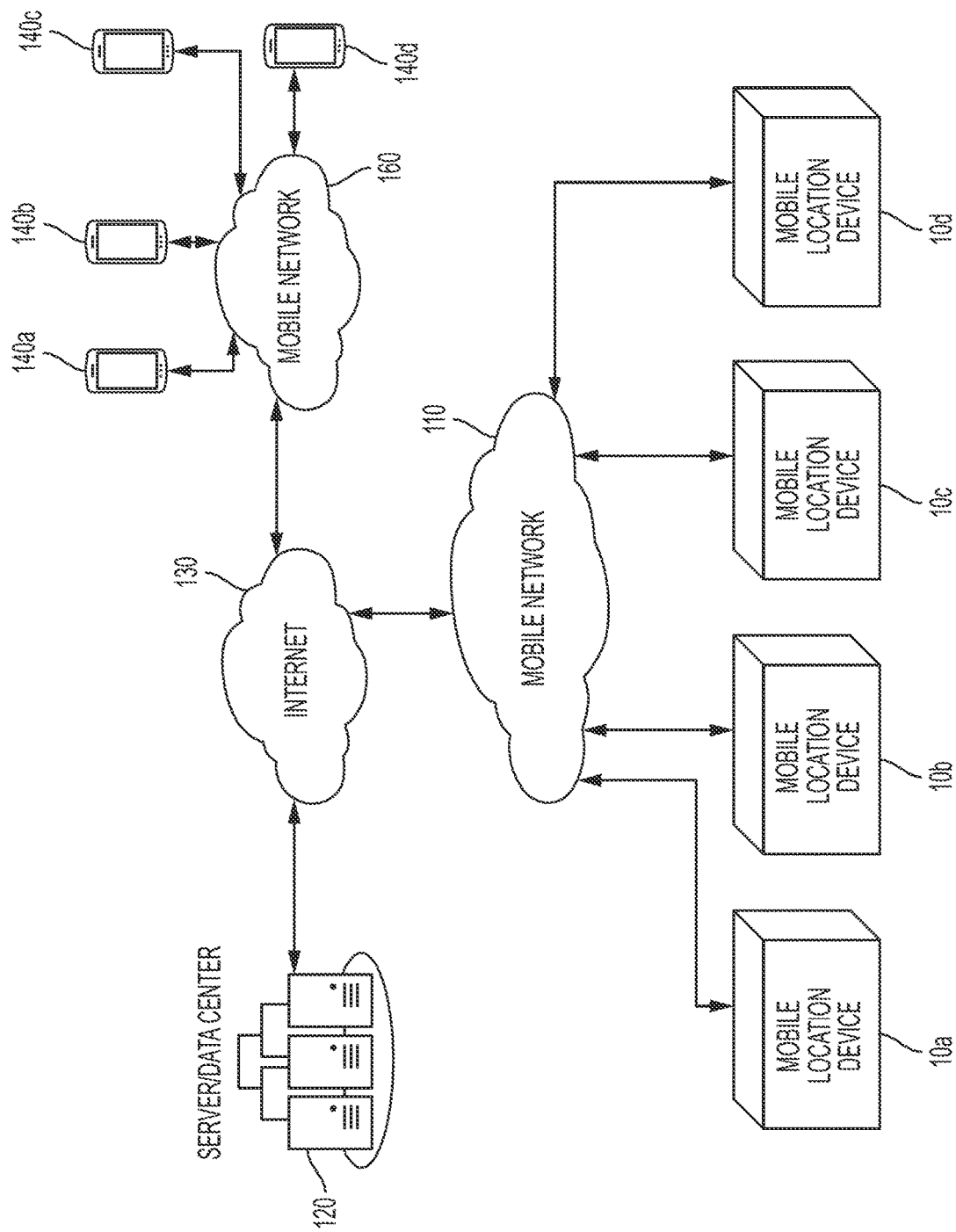
FIG. 2B is a block diagram of some implementations of the various systems and methods further illustrating a plurality of mobile location devices and a plurality of user devices.

FIG. 2B is a block diagram of some implementations of the various systems and methods further illustrating a plurality of mobile location devices and a plurality of user devices. The system elements of the mobile network 110, the data center 120, Internet 130, and the mobile network 160 and the lines or links of communication between them are the same or similar to the system elements discussed above in FIG. 1. FIG. 2B further illustrates a plurality of mobile location devices, such as mobile location device 10a, mobile location device 10b, mobile location device 10c, and mobile location device 10d operating within the system. These mobile location devices 10a-10d are each the same or similar to the mobile location device 10 described above. It should be appreciated that the system illustrated in FIG. 2B may support any suitable number of additional mobile location devices 10a-10d. In some implementations, a higher saturation of mobile location devices in any given geographic region provides better information to the servers in data center 120. This in turn, enables the servers in data center 120 to provide better information to the mobile location devices and elements in the system (e.g., mobile location devices 10a-10d and user devices 140a-140d). In some implementations having a plurality of different mobile networks 110, at least one of the mobile location devices 10a-10d may be in communication with one of the different mobile networks. For example, mobile location device 10a may be located in the United States and in communication with a mobile network 110 located in the United States. Whereas, mobile location device 10d may be located in the United Kingdom and may be in communication with a different mobile network.

FIG. 2B further illustrates user device 140a, user device 140b, user device 140c, and user device 140d. These user devices 140a-140d are each the same or similar to the user device 140 described above. It should be appreciated that the system illustrated in FIG. 2B may support any suitable number of additional user devices 140a-140d. Like user device 140, each user device 140a-140d is associated with at least one of the mobile location devices 10a-10d. In some implementations, user device 140 may be associated with more than one mobile location device 140a-140d. As noted above, these associations can be stored in a server or database in data center 120. For example, if user device 140a belongs to user A who has two cars, user A may place a mobile location device 10a in one car and a mobile location device 10b in the other car. Thus, the system may associate mobile location device 10a and mobile location device 10b with user A's user device 140a.

Figure 3:
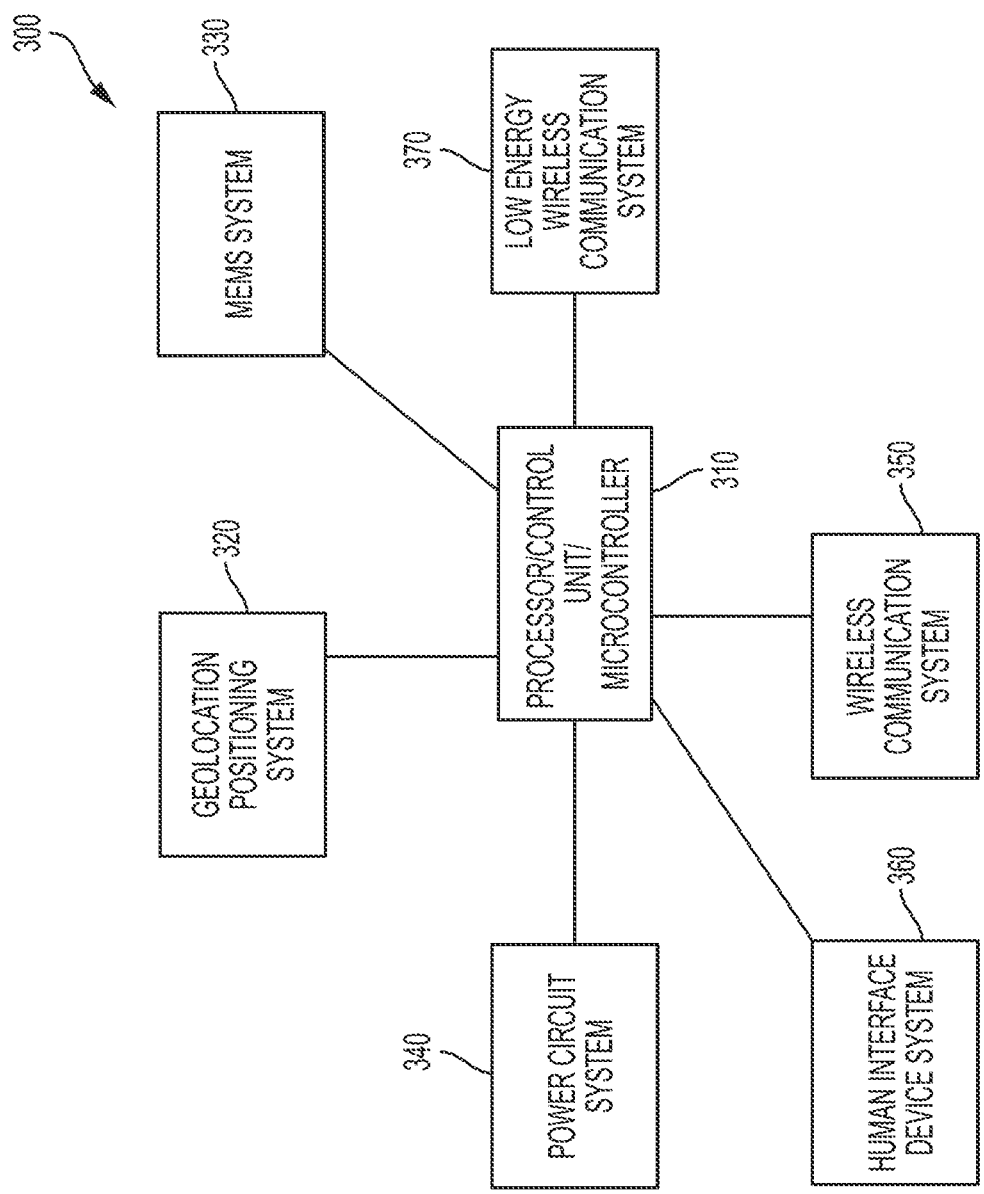
FIG. 3 is block diagram illustrating some implementations of elements contained in a mobile location device.

Turning now to FIG. 3, the block diagram illustrates system 300, which comprises subcomponents of a mobile location device 10 in some implementations. In some implementations, the mobile location device 10 includes at least one processor/control unit/microcontroller 310. Processor 310 may be an application specific integrated circuit (ASIC) or a general purpose processor. The processor 310 is in direct or indirect communication with a plurality of other components shown in FIG. 3 that enable the mobile location device 10 to detect its position or location with a high degree of accuracy. Processor 310 may coordinate the functions of other modules described herein. Processor 310 may further execute algorithms to increase accuracy of geolocation positioning, provide timely communication between the mobile location device and one or more servers. In some implementations, processor 310 further operates a link between a low-energy wireless communication module 370 and any external beacons positioned outside of vehicle 20.

In some implementations, the mobile location device 10 includes a geolocation positioning system 320, which is used to determine the location of the mobile location device 10 (and the vehicle 20 in which mobile location device 10 resides) at any given point in time and any geographical context. The geolocation positioning system 320 is in communication with processor 310. The geolocation positioning system 320 may comprise a custom processor that can receive and process satellite signals, such as global navigation satellite system (GNSS) signals (e.g., GPS, GLONASS, Galileo, etc.). The geolocation positioning system 320 may further include an antenna, amplifiers, signal filters, and the like, to effectively process received GNSS signals. The geolocation positioning system 320 transmits GNSS signals to processor 310 for further processing. In some implementations, the geolocation positioning system 320 comprises a reduced feature set to make the geolocation positioning system 320 affordable and functional for use in consumer devices. For example, in some implementations, the geolocation positioning system 320 lacks the ability to process raw GNSS data. In some implementations, the geolocation positioning system 320 may lack the ability to reduce or eliminate the effects of multipath signal distortion on its own. When a reduced feature set geolocation positioning system 320 is used, the reduced feature set may prevent the geolocation positioning system 320 from performing adequately in some areas such as dense urban areas. For example, a vehicle 20 with mobile location device 10 (including a reduced feature set geolocation positioning system 320) can be located in a geographic zone associated with a fuel pump designated as fuel pump #1. Yet, the reduced feature set geolocation positioning system 320 might erroneously determine its location as a geographic zone associated with fuel pump 3, for example, or no geographic zone associated with a fuel pump at all, due to multipath signal distortion. Even a more expensive GNSS processor may not be able to mitigate against multipath signal distortion on their own. However, when the geolocation positioning system 320 is configured with certain other systems and features discussed below, the geolocation positioning system 320 provides high accuracy location detection despite the reduced feature set of geolocation positioning system 320. The reduced feature set also enables the geolocation positioning system 320 to use less power in operation. In some implementations, geolocation positioning system 320 will detect a location of the mobile location device 10 within approximately 4 meters or less, as well energy dispensing related events. In some implementations, geolocation positioning system 320 may be included in vehicle systems, wherein processor 310 may communicate and receive GNSS data from vehicle systems (not shown).

In some implementations, various solutions can be adopted to help provide the desired positioning or location accuracy for mobile location device 10 with GNSS corrections data. For example, a differential GPS system assisted by the data received from the continuously operating reference stations (CORS), such as the one described in U.S. Pat. No. 5,490,073 (which is hereby incorporated by reference in its entirety), can provide help determining positioning in a dense urban environment. At present, there are several publicly operating CORS networks in the United States, such as NYSnet in the state of New York. The data from the CORS network can be obtained by the geolocation positioning system 320 in the mobile location device 10 via established protocols, such as the RTCM 10403.1 standard or other suitable standards. In some implementations, real-time kinematics data and raw data from the receiver are used to evaluate pseudo ranges and other variables in a custom algorithm that can be implemented in an ASIC or software, to determine a more precise location of the mobile location device 10 (and the vehicle 20). In some implementations, alignment to road maps, Assisted GPS, and other suitable techniques can be used to aid in determining the desired positioning or location accuracy of the mobile location device 10.

In some implementations, system 300 further includes MEMS system 330. The processor 310 is in communication with the MEMS system 330. In some implementations, the MEMS system 330 is an inertial measurement sensor (IMU) that comprises at least an accelerometer and a gyroscope. The MEMS system 330 can measure linear and angular motion of the mobile location device 10. In some implementations, the MEMS system 330 further comprises a magnetometer. The MEMS system 330 may comprise other suitable sensors. When processor 310 combines data from geolocation positioning system 320 and the MEMS system 330, the processor 310 can more accurately determine the position of the mobile location device 10 in vehicle 20. This increased accuracy assists in establishing the energy dispensing events and energy dispensing sessions while using a reduced feature set geolocation positioning system 320. In some implementations, when the geolocation positioning system 320 is not operating properly (e.g., it cannot receive satellite signals when under a bridge or in a tunnel), data from the MEMS system 330 may augment or supplant data from the geolocation positioning system 320 to assist in establishing a vehicle location for transaction events such as the energy dispensing events, energy dispensing sessions, parking events, parking sessions, etc. In some implementations, system 300 of mobile location device 10 may not include a MEMS system 330. In some implementations, MEMS system 330 may be included in vehicle systems, wherein processor 310 may communicate and receive MEMS data from vehicle systems (not shown), such as a vehicle motion detection or domain (VMD) system.

In some implementations, the processor 310 may communicate with a vehicle's systems via a Controller Area Network ("CAN bus"). It should be appreciated that processor 310 may any suitable available data from existing systems of a vehicle and use this data to determine a vehicle's location. In some implementations, the mobile location device 10 can be configured as an embedded system in a vehicle or is otherwise integrated into a vehicle. In some such implementations, the features described herein of processor 310 can be integrated into a processor of a vehicle. In some such implementations, one or more of the mobile location device 10 systems shown in FIG. 3 can be separate elements that already exist in a vehicle and a processor 310 can be in communication with these various systems to obtain the appropriate data to perform the high accuracy location determination functions described herein.

In some implementations, processor 310, or an AISC or processor not shown, may configured to comprise an estimation filter, such as a Kalman filter, wherein such a filter is configured to determine and maintain a predictive location estimation model estimating a current position based on an input stream of data received from a GNSS module and MEMS (or VMD) system. In some implementations, as will be described later herein, a novel dual mode Kalman filter comprising a constant position mode and a dynamic mode may be used.

In some implementations, system 300 further includes a power circuit system 340. The power circuit system 340 may include one or more batteries, a charging port, an electrical outlet, and a power management integrated circuit. The power circuit system 340 supplies power to the various components of system 300 in mobile location device 10. In some implementations, power circuit system 340 monitors power reserves and communicates with processor 310 to determine when to reduce operations of certain system 300 components to conserve power or when to shut down mobile location device 10. In some implementations, the mobile location device 10 uses the battery to keep some operational information in buffers to enable the mobile location device quickly start (instead of a cold start where the mobile location device 10 may have to go through a longer boot/initialization procedure to be usable). In some implementations, mobile location device 10 configured with an estimation filter, may use the battery to maintain the predictive location estimation model therein. In some implementations, the mobile location device 10 includes a second battery to maintain satellite almanac information in RAM buffers. This enables the mobile location device 10 to start without having to reestablish the Time To First Fix with the satellites.

In some implementations, system 300 further includes a wireless communication system 350. Wireless communication system 350 provides a communication link between the mobile location device 10 and at least one server (through the communications links discussed herein). The wireless communication system 350 may include a cellular data processor, an antenna, a SIM card (and/or eSIM functionality), and other components necessary to communicate with mobile networks, like mobile network 110. In some implementations, communications from processor 310 to the server (through mobile network 110) follows a predefined protocol and can be established, for example, through Internet connections based on HTTP protocols and the HTTPS extension protocols (e.g., GET and POST request methods), through a protected Virtual Private Network (VPN), or a combination of both. For example, mobile location device 10 and a server in data center 120 can be connected via a VPN tunnel created using the processor 310 in communication with wireless communication system 350. In some implementation, the connection can be constantly refreshed and the messages reach both destinations (mobile location device 10 and the server) through open sockets.

In some implementations, system 300 further includes a human interface device system (HID) 360. The HID 360 may include one or more buttons that the user can press. The HID 360 may include one or more LED lights that can provide the user with useful system status information. In some implementations, HID 360 includes a screen capable of generating and displaying messages to the user (e.g., reporting battery life, reporting system status, reporting energy dispensing device zone information, etc.). The HID 360 communicates with processor 310 to receive user input or to provide the user with information.

In some implementations, system 300 further includes a low energy wireless communication system 370. The low energy wireless communication system 370 may comprise a processor, an antenna, and other components necessary to communicate with other low energy wireless devices. The low energy wireless communication system 370 may be configured to communicate over a predetermined protocol, such as IEEE 802.15 (e.g., Bluetooth). The low energy wireless communication system 370 can communicate with processor 310 of system 300 in mobile location device 10. In some implementations, low energy wireless communication system 370 can communicate with remote parking enforcement devices, energy dispensing devices, beacons in parking garages, beacons in energy dispensing stations, and other similarly configured wireless devices, which may facilitate location detection in places with no or limited satellite system signals (e.g., in locations where GNSS signals cannot be obtained).

Figure 4:
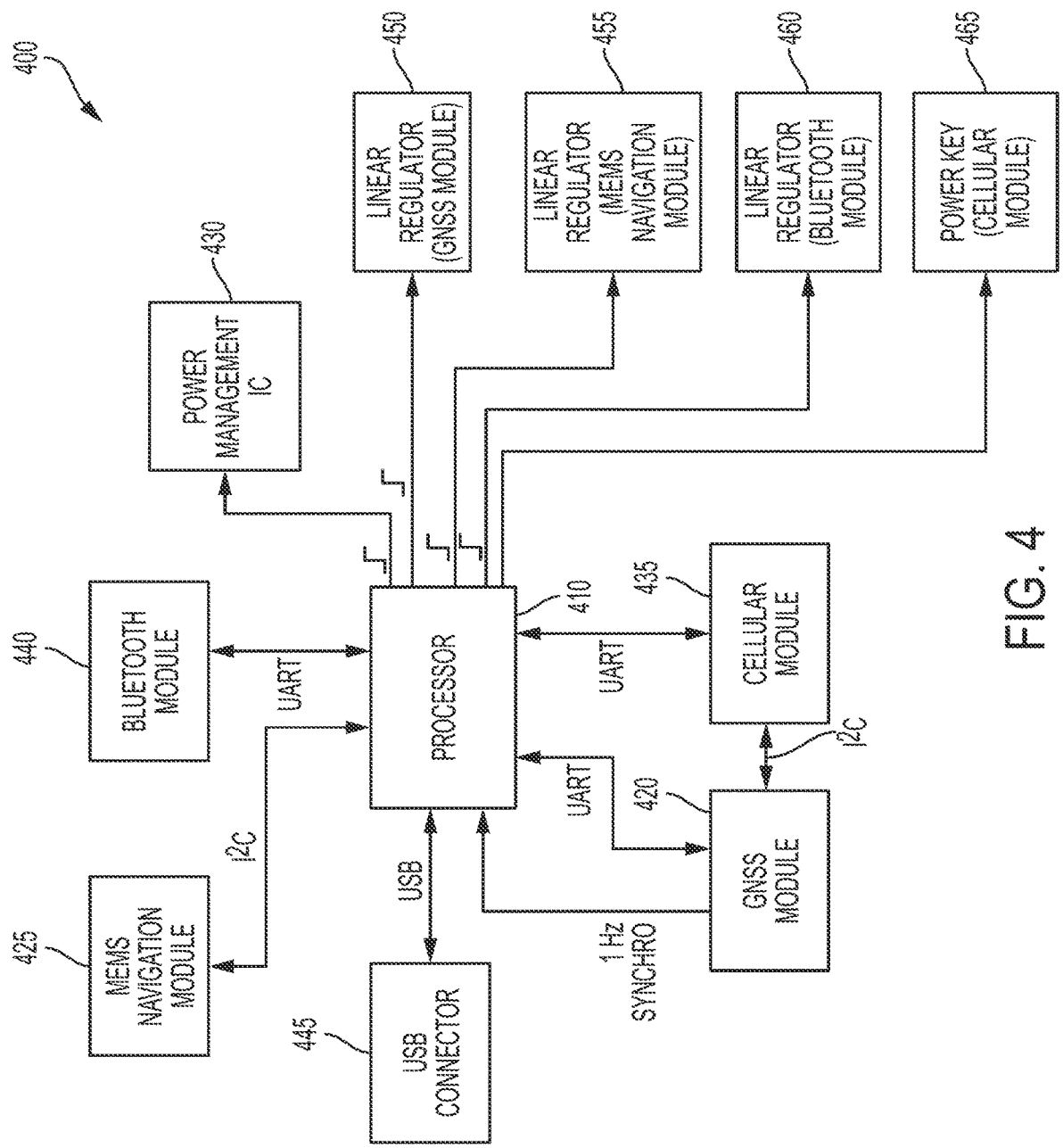
FIG. 4 is a block diagram illustrating some implementations of the signaling between components of the mobile location device.
Figure 5:
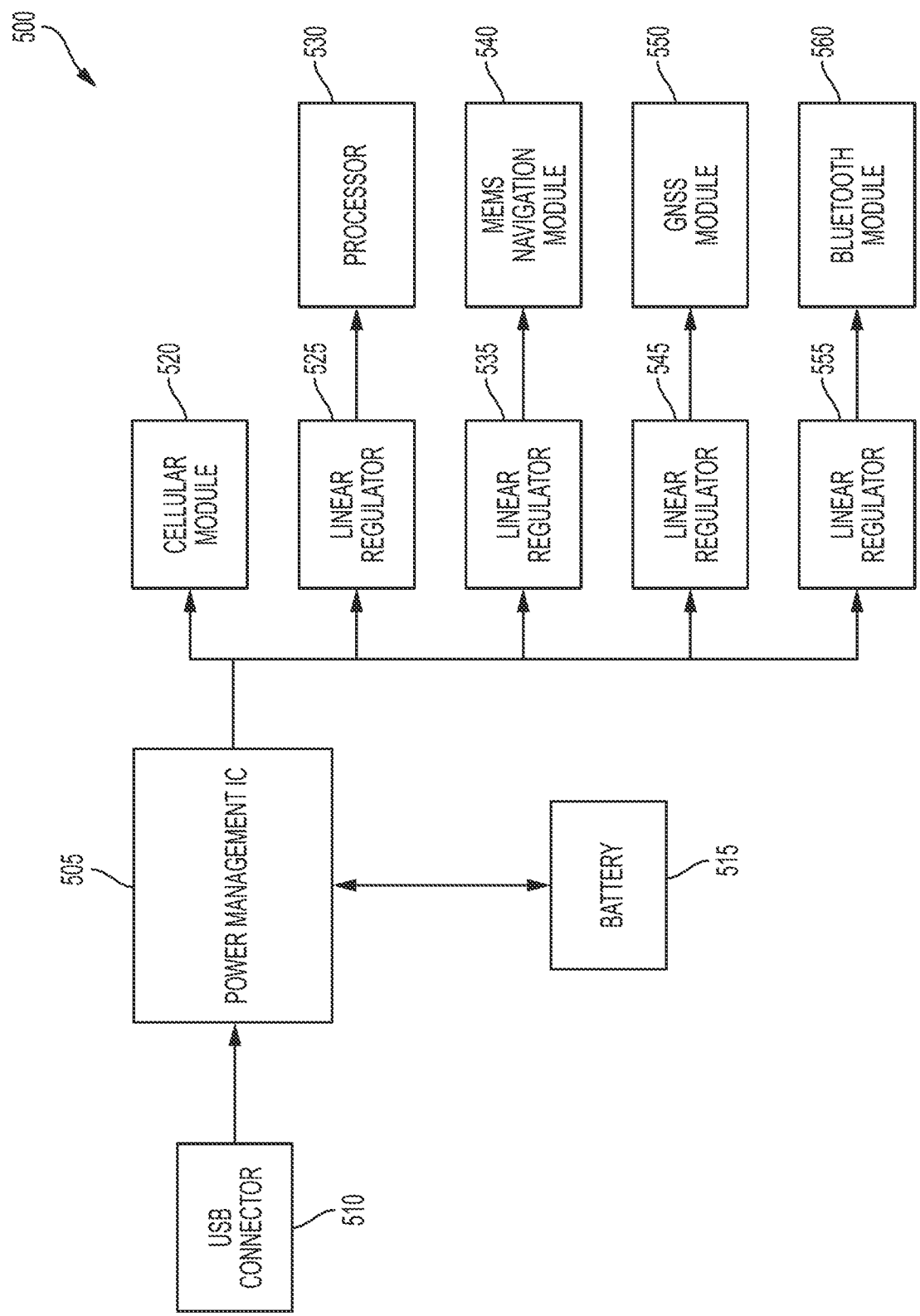
FIG. 5 is a block diagram illustrating some implementations of the connections between the power subsystems of the mobile location device.
Figure 6:
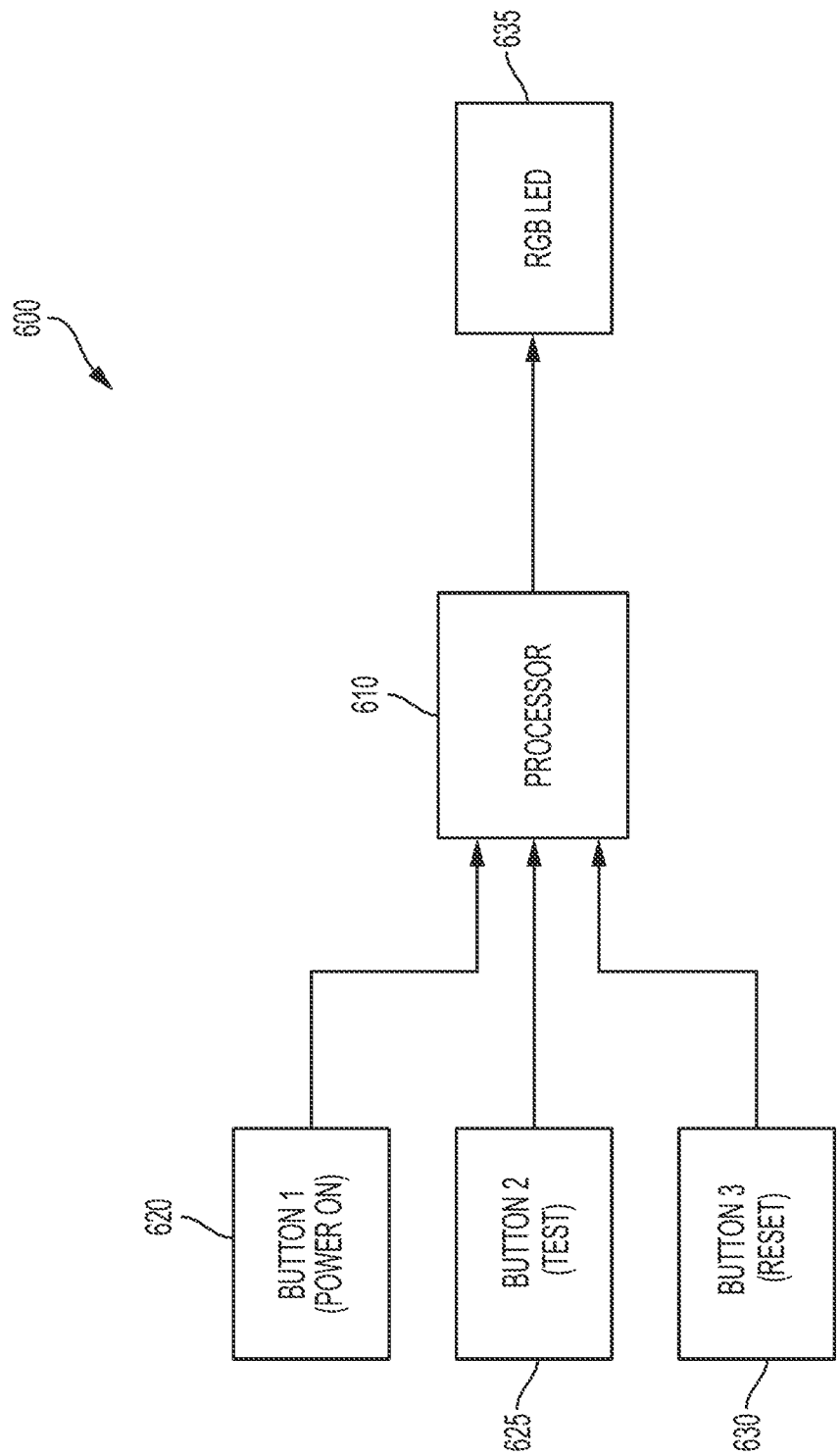
FIG. 6 is a block diagram illustrating some implementations of the connections between the human interface device subsystem of the mobile location device.

FIGS. 4, 5, and 6 are block diagrams that illustrate more detail regarding some of the components of system 300 in mobile location device 10, which were discussed in connection with FIG. 3.

Turning now to FIG. 4, some implementations of the signaling between certain components of the mobile location device 10 are illustrated. As noted in FIG. 3, the processor 410 (also shown as processor 310 in FIG. 3) is in communication with a plurality of different components. In various implementations, processor 410 manages power, collects, and uses information from the different modules illustrated in FIG. 4. The processor 410 is in communication with GNSS module 420 (which is a component of geolocation positioning system 320) via universal asynchronous receiver-transmitters (UART). Information about coordinates from the GNSS module 420 are transmitted to the processor 410 via UART. The GNSS module 420 may generate a 1 Hz pulse and transmit the 1 Hz pulse to the processor 410 in some implementations. In some implementations, the 1 Hz pulse may be used to synchronize data from the different modules or components that communicate with processor 410.

Also illustrated are a MEMS Navigation module 425 (which is a component of MEMS system 330 in FIG. 3), cellular module 435 (which is a component of wireless communications system 350 in FIG. 3), and Bluetooth module 440 (which is a component of low energy wireless communication system 370 in FIG. 3). The MEMS Navigation module 425 communicates with the processor 410 via Inter-Integrated Circuit (I²C) while cellular module 435 and Bluetooth module 440 communicate with processor 410 via UART. It should be appreciated that the modules described herein may communicate with processor 410 using any suitable method. For example, the MEMS Navigation module 425 transmits inertial measurement data via I²C to processor 410, which can be used to help correct the coordinates data that processor 410 obtains from the GNSS module 420. Processor 410 transmits data via UART to cellular module 435, through which the mobile location device 10 communicates with a server to transmit the current state of the mobile location device 10 such as mobile location device 10's coordinates and status. In some implementations, GNSS module 420 can communicate with the cellular module 435 via I²C to supply the GNSS module 420 with GNSS corrections data. In some implementations, firmware on mobile location device 10 may be updated through the cellular module 435 in communication with processor 410. In some implementations, the Bluetooth module 440 communicates with the processor 410 via UART to establish a connection between the mobile location device 10 and the user's user device 140.

USB connector 445 is illustrated as connected to the processor 410 via the universal serial bus standard. In some implementations, mobile location device 10 may not include a USB connector 445. In some implementations, mobile location device 10 includes other types of suitable connectors. In various implementations, USB connector 445 can be used to power the mobile location device 10, charge batteries in mobile location device 10, and update firmware on mobile location device 10.

The power management IC 430 (which is a component of power circuit system 340 in FIG. 3), linear regulator 450, linear regulator 455, linear regulator 460, and a Power Key 465 are in communication with processor 410. Processor 410 can control, using logic levels, the power of the device as well as power to different components illustrated in FIG. 4 in some implementations. For example, processor 410 can turn off the entire mobile location device 10, or turn off output of the power linear regulators 450, 455, and 460 to the individual modules (power connections between the modules are illustrated in FIG. 5). Processor 410 can also turn off the cellular module 435 by sending logic level signal to the Power Key 465 in some implementations. In some implementations, the ability to selectively shut down the different modules creates a very power efficient device.

FIG. 5 illustrates a block diagram of some implementations of a power circuit system 500 (which corresponds to power circuit system 340 in FIG. 3) showing power supply interconnections. In one implementation, the center of the power supply is a power management integrated circuit (IC) 505 that is configured to receive power from both the USB connector 510 (which corresponds to USB connector 445 in FIG. 4) and the battery 515 and dynamically switch between the two power supplies. In some implementations, if the USB connector 510 is used for power, power management IC 505 causes the battery to be charged. In the illustrated implementations, cellular module 520 (which corresponds to cellular module 435 in FIG. 4) is fed directly from power management IC 505. The other illustrated modules processor 530, MEMS navigation module 540, GNSS module 550, and Bluetooth module 560 are all powered via LDO (Low Dropout) linear regulator 525, linear regulator 535, linear regulator 545, linear regulator 555. As noted above, the modules in FIG. 5 correspond to modules discussed above in FIG. 4, which are components of the systems discussed in FIG. 3. As also noted above in connection with FIG. 4, this configuration enables processor 410 to control power supplied to the various modules to ensure efficient use of power. For example, processor 410 can shut down GNSS module 550 where processor 410 determines that the mobile location device 10 is in a location where no GNSS signals can be received (e.g., a parking garage, in a tunnel, etc.). Processor 410 can be configured to selectively shut down different modules under different triggering conditions to ensure maximum battery life or most efficient power consumption of the mobile location device 10. Triggering events may include events such as the expiration of timers after a stop condition is detected by MEMS data and/or GNSS data.

FIG. 6 illustrates a block diagram of some implementations of a human interface device (HID) system 600 (which corresponds to HID 360 in FIG. 3) showing human input and feedback mechanisms of mobile location device 10. In the illustrated implementations, processor 610 (corresponding to the processor 310, 410, etc.) is connected to button 620, button 625, button 630 and LED 635. It should be appreciated that fewer buttons or more buttons can be added to mobile location device 10. In some implementations, a plurality of LED lights are used to supply information to a user of mobile location device 10. In some implementations, a display screen may be included in addition to or in place of the LED 635. In the illustrated implementations of FIG. 6, button 620 is associated with turning the power on to mobile location device 10; button 625 is associated with triggering an internal diagnostic test of the mobile location device 10; and button 630 is associated with resetting the mobile location device. The buttons may be configured to trigger any suitable function. In some implementations, one or more buttons may be associated with a plurality of different functions. In some implementations, the reset button 630 may be recessed from the surface of the mobile location device 10 to prevent accidental activation. In some implementations, LED 635 may provide information status to a user in a variety of different ways. In some implementations, LED 635 may illuminate a particular color when the device is powered on, illuminate a different color when a test is running, illuminate yet a different color when a reset is in process. In some implementations, the processor 610 may cause the LED 635 to flash in different patterns to alert the user of different events (e.g., communication mode, low battery mode, charging mode, error conditions, etc.).

Turning now to the operations of mobile location device 10, as noted above, mobile location device 10 can be configured with different GNSS modules which can produce a variety of levels of coordinate accuracy. As noted above, some uses of location or positioning data require a high degree of accuracy. For example, some require positioning accuracy of approximately four meters or less. Obtaining this level of accuracy can be difficult in certain situations, like dense urban setting, whether using expensive GNSS modules or less expensive GNSS modules. Obtaining usable GNSS data in dense urban setting introduces a number of challenges. High buildings in "urban canyons" can completely block GNSS signals from a number of satellites which results in a poor satellite geometry. Parking garages and energy dispensing device island canopies may obstruct GNSS signals. GNSS signals can be reflected by various surfaces which leads to the non-line-of-sight (NLOS) GNSS signal reception as well as the multipath contamination of GNSS signals. When a GNSS receiver is placed inside a vehicle, the sky view may be additionally obstructed by the roof of a vehicle and multipath effects are potentially enhanced by bodies and objects present in the vehicle. When traveling below a threshold speed (e.g., 2 km/hour, 5 km/hour or some other suitable speed), GNSS signals may also suffer from drift errors (e.g., the GNSS signals indicate positions nearby that are other than the actual position of a vehicle). Many GNSS modules and systems (e.g., GNSS receivers and antennas) are vulnerable to the aforementioned effects. The aforementioned effects can result in long position detection convergence times and coordinate jumps of more than 10 meters. Some high end GNSS receivers are configured to mitigate some of the impact of the above mentioned negative effects on a hardware level. However, such high end GNSS receivers are extremely expensive, extremely large, require high energy consumption, and still suffer from the same issues. These high end GNSS receivers are unavailable for mass-market platforms due to the high cost, unacceptable physical sizes, and high energy consumptions of these devices. Moreover, in a dense urban setting, even high end GNSS receivers are often not capable of overcoming issues derived from poor satellite geometry, NLOS signals reception, multipath effects, and low speed drift effects, to provide coordinates output of a sufficient integrity (e.g., approximately four meters of less) to be useful for location systems that require high accuracy position detection.

Thus, a need exists for a high accuracy location (or position) detection system that can use inexpensive, low end GNSS receivers. As will be discussed in FIG. 7 and FIG. 8, the disclosure herein details a high accuracy location (or position) detection system that can use inexpensive GNSS receivers, wherein using an estimation filter as disclosed, a high accuracy location detection of approximately four meters or less may be achieved, yet the detection system may be low in cost, small in size, and low in energy consumption. In some implementations, the GNSS data streams may be supplemented with at least one or more other location data sources to achieve a high accuracy location detection of approximately four meters or less, yet be low in cost, small in physical size, and low in energy consumption. In some implementations, a high accuracy location (or position) detection system may use both an estimation filter and a supplementing of GNSS data streams with other data source as disclosed herein, and achieve a high accuracy location detection of approximately four meters or less, yet be low in cost, small in physical size, and low in energy consumption.

Figure 7:
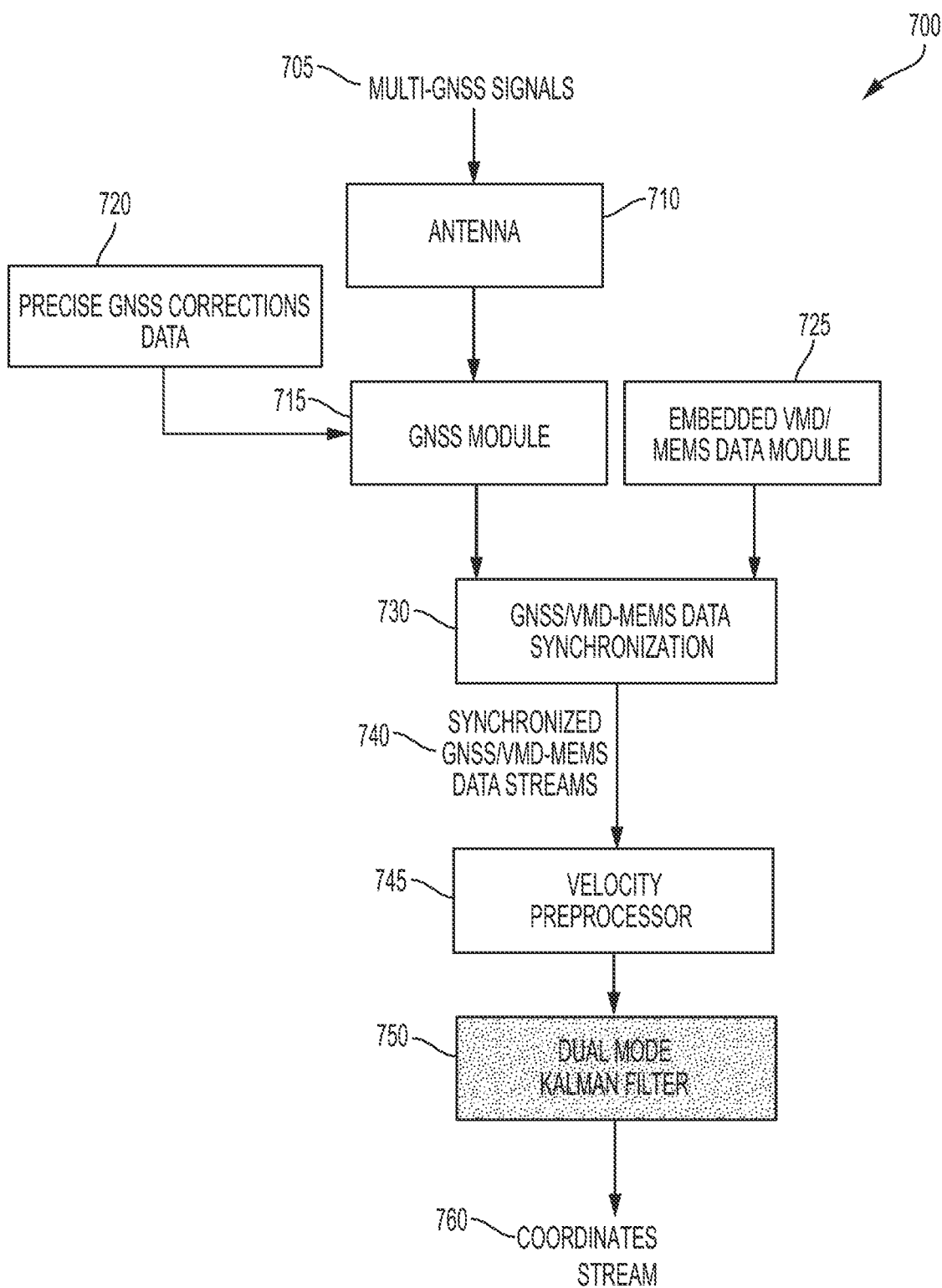
FIG. 7 is a flowchart illustrating some implementations of the signal processing paths of location data in the mobile location device.

FIG. 7 is a flowchart of some implementations illustrating signal processing paths of process 700 that obtains location data streams at the mobile location device 10. One or more processors in mobile location device 10 will convert the location data streams into high accuracy location data associated with the mobile location device 10. In some implementations, mobile location device 10 obtains location data streams from a plurality of sources. The sources may include GNSS signals 705 from satellites such as GPS and GLONASS; GNSS corrections data 720, and inertial sensor and/or other sensor measurement data of embedded VMD/MEMS data module 725, wherein vehicle motion data may originate in an embedded vehicle motion detection ("VMD") system (not shown) and/or a MEMS module (as shown in FIG. 4, MEM Navigation module 425) of mobile location device 10. In some implementations, when mobile location device 10 is not an embedded system within the vehicle does not have access to vehicle motion data from vehicle sensors (e.g., wheel velocity data, yaw rate, etc.), the VMD/MEMS data module 725 is a MEMS module without access to VMD of the vehicle. In some such implementations, the MEMS module can be used to provide vehicle velocity derived from accelerometer data and yaw rate from a gyroscope. In some such implementations, the MEMS provided vehicle velocity data can be used as a backup or alternative to GNSS derived velocity data from the GNSS data. In some implementations, when mobile location device 10 is not an embedded system within the vehicle, the VMD/MEMS data module 725 may have access to a vehicle's VMD, such as through the vehicle's CAN bus. In some such implementations, one or more items of vehicle motion data can be derived from the vehicle's sensors, such as the vehicle wheel speed (e.g., for the accurate velocity data) and the steering angle (e.g., which can be used to calculate yaw rate). In some implementations, when mobile location device 10 is an embedded system within a vehicle, the VMD/MEMS data module 725 may not require a separate MEMS module. That is, in some such implementations, the VMD/MEMS data module 725 may obtain non-GNSS derived motion data from one or more various sensors built into a vehicle that already provide wheel speed data, yaw rate data, etc. In some implementations, mobile location device 10 may also obtain GIS data (not shown). Mobile location device 10 may obtain other suitable data input streams in some implementations. It should be appreciated, that some or all of the location data input streams illustrated in FIG. 7 may not be used or obtained in some implementations. When available and as needed, GNSS module 715 obtains GNSS signals 705 from available satellites through an antenna 710. The GNSS signals 705 may include information such as, but not limited to: GPS timestamp; latitude, longitude, height; solution status; ground speed; and azimuth.

In some implementations, the GNSS module 715 may also obtain GNSS corrections data 720, although this is not required. While not shown, in some implementations, GNSS correction data 720 may be obtained from a processor such as processor 310 of the mobile location device 10. Processor 310 may obtain such GNSS correction data 720 via a server in data center 120 or a server connected to Internet 130 through mobile network 110. In some implementations, GNSS correction data 720 may be received from other sources such as fixed ground-based reference stations. The GNSS correction data 720 may include differential GPS data, ephemeris, almanac, accurate time, satellite status, and any other suitable data points. As will be discussed further below, a processor of the mobile location device 10 (e.g., processor 310) may apply the GNSS correction data 720 to received GNSS signals 705 to calculate and determine more precise GNSS location data of mobile location device 10.

Embedded VMD/MEMS data module 725 (which corresponds to MEMS system 330 and MEMS Navigation module 425, and/or an embedded VMD system of the vehicle) includes sensors such as an accelerometer and a gyroscope, and in the case of the VMD, may include similar sensor data as the MEMS data, and may comprise vehicle motion data associated with sensors coupled to vehicle mechanical systems such wheel rotation (wheel speed) and steering angle (turn radius). In some implementations, the embedded VMD/MEMS module 725 obtains vehicle motion data such as: linear acceleration, magnetic fields, and an angular rate. In some implementations the MEMS system 330 may include at least three distinct channels of each measurement to obtain inertial motion data in 3 dimensions. In some implementations, as noted above, the acceleration provided by the MEMS system 330 can be used to calculate a vehicle's velocity that is non-GNSS derived velocity and is vehicle motion data velocity. In some implementations, the calculated vehicle velocity can be used as the velocity information provided to the dual mode Kalman filter described below. In some implementations, the calculated vehicle velocity from the MEMS system 330 is provided to the dual mode Kalman filter and used in place of GNSS derived velocity information obtained from the GNSS module (e.g., when GNSS data cannot be trusted because the GNSS data has a high associated level uncertainty—as can be determined from CN0 data)

The GNSS module 715 and the embedded VMD/MEMS data module 725 transmit their data to the GNSS/VMD-MEMS data synchronization block 730, which synchronizes the data streams, wherein synchronized GNSS/VMD-MEMS data streams 740 may be input to an estimation filter, such as a Kalman filter 750 which can estimate a final set of coordinate data 760. It should be appreciated that final in reference to the final set of coordinate data 760 is not final in the sense that additional coordinate data is not generated. In some implementations, the estimation filter continuously generates coordinate data. In some implementations, the data (e.g., the GNSS/VMD-MEMS data streams 740) fed to the estimation filter, like the Kalman filter 750, may be assigned a weight or trust value, which the estimation filter can use to determine how the data will be used to generate the coordinate data. As trust in the data decreases, the estimation filter may rely less on the provided data to generate coordinate data. For example, a velocity preprocessor 745 may determine a variance position measurement value (VPMV) based on the CN0 data obtained from the received GNSS data. As the CN0 value is decreased, the VPMV value may increase along a particular scale. In some implementations, the VPMV is provided to the estimation filter along with the GNSS data. As the VPMV value increases for the GNSS data, the estimation filter may rely less on the GNSS data and more on the VMD-MEMs data to generate coordinate data. In some implementations, for example, where the CN0 value for GNSS data is below a predetermined threshold (e.g., 20 or some other suitable number), the velocity preprocessor 745 may determine a VPMV value for the GNSS data that is so high that the estimation filter may substantially disregard the GNSS data when generating the coordinate data.

In some implementations where the GNSS data is substantially disregarded, for example, the velocity preprocessor 745 that can determine whether to use velocity data from GNSS data (GNSS derived velocity) or velocity data from a MEMS system 330 (vehicle motion data velocity). For example, if CN0 data obtained from GNSS data indicates that the GNSS data is below a threshold level of uncertainty or the VPMV is above a threshold value, the velocity preprocessor 745 may cause velocity data calculated from the MEMS system 330 to be fed to the dual mode Kalman filter 750. For example, a processor of the vehicle motion device 10 may calculate velocity data from acceleration data obtained from a MEMS system and this velocity data can be used by the Kalman filter 750 in its generation of coordinate data over velocity data obtained from the GNSS data.

In some implementations, where GNSS data is derived from more than one GPS satellite system, the process of determining whether the CN0 is below a threshold level of uncertainty is based on taking the average of more than one CN0 data point from at least two of the GPS satellite systems that were used to provide the GNSS data. In some implementations, the CN0 value that is used to determine whether CN0 is below the threshold level of uncertainty is calculated using the average CN0 value from each satellite system used to generate the GNSS data. In some implementations, the CN0 value that is used to determine whether CN0 is below the threshold level of uncertainty is calculated using the average CN0 value from a subset of the satellite systems used to generate the GNSS data. While the velocity preprocessor 745 is shown as separate from the dual mode Kalman filter 745, in some implementations, the functions of the velocity preprocessor 745 can also be integrated into the dual mode Kalman filter 750. It should be appreciated that where vehicle wheel speed data is available (e.g., when VMD information can be obtained), the velocity preprocessor 745 may not be needed or will default to using the vehicle wheel speed data over velocity data from GNSS data or velocity data calculated from the MEMS system 330. Final coordinates may be continuously output by Kalman filter 745 as a coordinate data stream 760, and may, for example, be set to a 1 Hz output rate based, in some implementations, on the GNSS module 715 having a raw data output rate of 1 Hz. In some implementations, the estimation filter may be a novel dual mode Kalman filter 750 as will be discussed in regards to FIG. 8.

It should be appreciated that a processor, such as processor 310 in mobile location device 10, may be responsible and configured to receive the data streams from the GNSS module 715 and the embedded VMD/MEMS data module 725 and perform the synchronization, and perform calculations which may include Kalman filter 750 calculations. In some implementations, processor 310 may receive the precise GNSS corrections data 720 and apply corrections to GNSS signals from GNSS module 715 without routing the precise GNSS corrections data 720 to the GNSS module 715.

Figure 8:
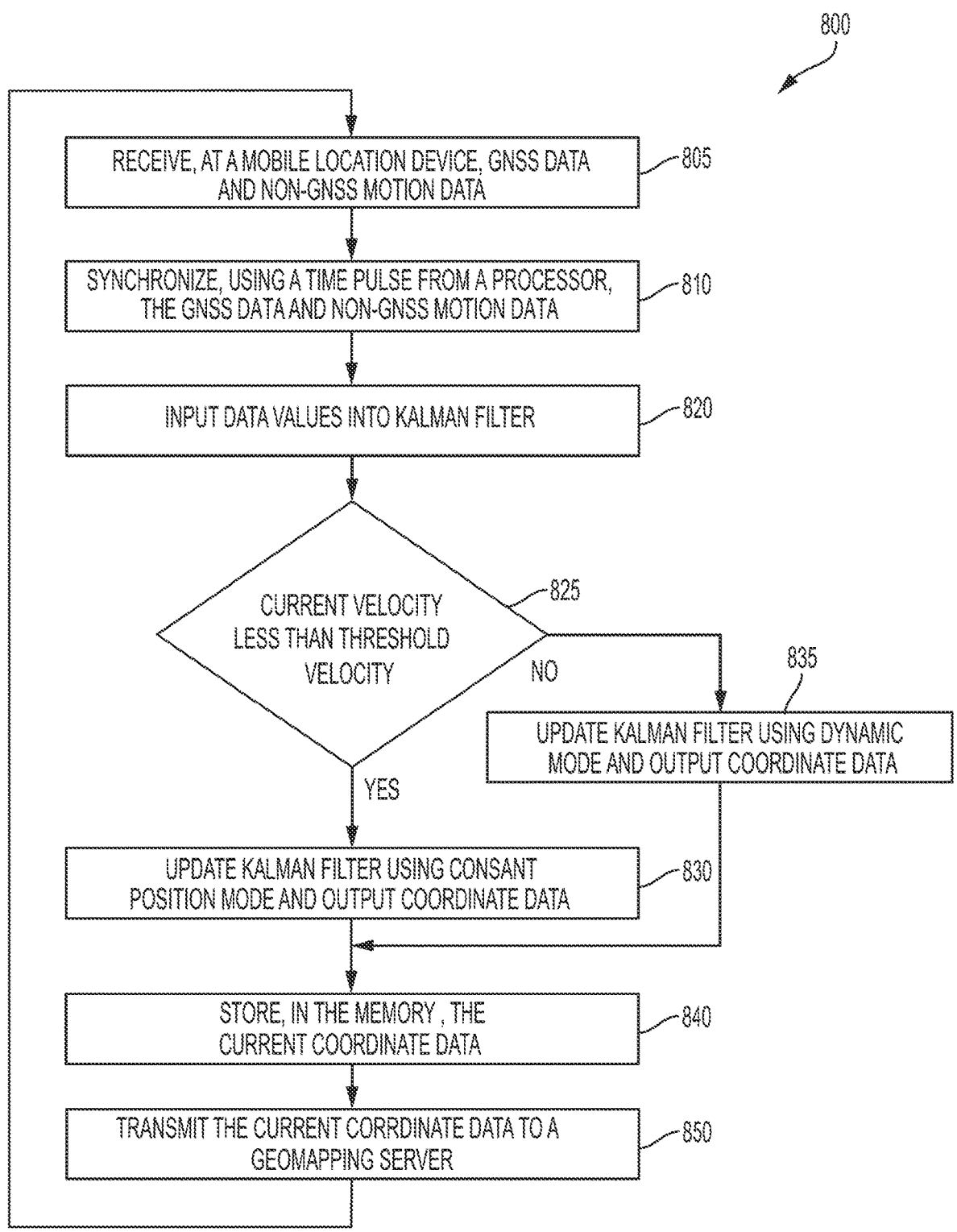
FIG. 8 is a flowchart that illustrates some implementations of the system and method for capturing and calculating coordinate data of a mobile location device.

FIG. 8 is a flowchart of process 800 that illustrates some implementations of the system and method for capturing and calculating high accuracy coordinate data of a mobile location device (e.g., mobile location device 10). At block 805, in some implementations, a processor, such as a processor of mobile location device 10 can receive GNSS data and non-GNSS motion data (e.g., vehicle motion data received from a MEMS and/or a VMD). In some implementations, for example, GNSS data can be received from the GNSS module 725 and non-GNSS motion data can be received from a VMD/MEMS data module 725. As noted in FIG. 7, the GNSS module 715 may receive GNSS satellite data or GNSS satellite data plus correction data from a plurality of other sources in some implementations. Where more than one source of GNSS data is received, a processor of the GNSS module may modify GNSS satellite data with any received corrective data. At block 810, in some implementations, as noted above, the GNSS module obtains timing data from the GNSS data and uses this data to generate a synchronizing timing pulse. In some implementations, a processor of the mobile location device 10 provides the synchronizing timing pulse. Synchronizing timing pulses can be provided using other suitable mechanisms. At block 810, in some implementations, the processor of the mobile location device 10 synchronizes, using a timing pulse, the received GNSS data and the non-GNSS motion data. In some implementations, the processor of the mobile location device 10 may also preprocess the GNSS and non-GNSS motion data to determine a source of velocity data to use. For example, the processor of the mobile location device 10 may determine whether to use velocity data from the GNSS data or calculate a velocity data point from the non-GNSS motion data such as discussed in connection with the velocity preprocessor 745 in FIG. 7.

At block 820, the synchronized data values are input into a Kalman filter. In some implementations, the Kalman filter is a novel multimode Kalman filter. In some implementations, the multimode Kalman filter includes a first mode and a second mode. In some implementations, the Kalman filter can include fewer modes or additional modes. In some implementations, the first mode of the Kalman filter is a dynamic mode, wherein the Kalman filter generates predictive position coordinate data for a vehicle and adjusts probabilities for a model used to generate a next predictive position coordinate data based on the received GNSS data and the non-GNSS motion data. In some implementations, the second mode of the Kalman filter is a constant position mode where certain data from the GNSS data and the non-GNSS motion data can be set to a same predetermined value or different predetermined values, wherein the predetermined value(s) are irrespective of the data being received from the GNSS module or a VMD/MEMS data module. In some implementations, certain data from the GNSS data and the non-GNSS motion data is altered or replaced for the constant position mode of the Kalman filter. The constant position mode is referred to as such due to one or more types of data that can be set to a predetermined value rather than relying on the dynamic values obtained from the GNSS module or a VMD/MEMS data module. In some implementations, the predetermined value can be zero or some other suitable value. In some implementations, the speed value used by the Kalman filter to generate vehicle location coordinate data can be set to a predetermined value (e.g., zero or some other suitable number). In some implementations, setting the speed value to a predetermined value may override or otherwise alter a speed value provided by the GNSS module or speed provided by the VMD/MEMS data module. In some implementations, the yaw rate used by the Kalman filter to generate vehicle location coordinate data can be set to a predetermined value (e.g., zero or some other suitable number). In some implementations, setting the yaw rate value to a predetermined value may override or otherwise alter the yaw rate value provided by the VMD/MEMS data module. In some implementations of the constant position mode, the heading value can be set to a fixed value. It should be appreciated that other suitable values can be altered for the constant position mode of the Kalman filter.

At block 825, where the current velocity is less than a predetermined threshold velocity (e.g., such as 2 km/hour, 5 km/hour, or some other suitable speed), the Kalman filter switches or alters to the second mode or constant position mode. For example, as shown in block 830, in some implementations, the Kalman filter updates using the constant position mode and generates/outputs coordinate data based on the updated predictive model maintained by the Kalman filter. In some implementations, for the constant position mode of Kalman filter 750, the velocity and yaw (e.g., turn rate) are set to zero, and the heading is fixed. For example, in some implementations, the heading can be fixed to the last known heading output by the Kalman filter 750 when the current velocity is determined to be below a predetermined threshold velocity. In some implementations, when the current velocity is determined to be below a predetermined threshold velocity, Kalman filter may remain in the constant position mode until a triggering event occurs. In some implementations, the triggering event can be a predetermined time period. In some implementations, the triggering event can be determining that the velocity of the vehicle is above the threshold velocity. In some implementations, when the triggering event occurs, the Kalman filter may return to the dynamic mode (e.g., the first mode). In some implementations, when the constant position mode is triggered for the Kalman filter, the mobile location device 10 may capture a predetermined number of Kalman filter coordinate outputs from block 830. In some implementations, the predetermined number of captured coordinate outputs is five coordinate outputs from the Kalman filter. In some implementations, the predetermined number can be fewer five or more than five. In some implementations, the coordinate outputs using the constant position mode of the Kalman filter are used to determine a service that can be triggered based on the vehicle location (e.g., a parking session, a vehicle fueling session, a vehicle charging session, a curbside pickup session, etc.).

Returning to block 825, in some implementations, where the current velocity is not less than a predetermined threshold velocity, such as 2 km/hour (some other suitable threshold), the Kalman filter in block 835, updates using a dynamic mode and outputs coordinate data based on the updated predictive model maintained by the Kalman filter. In some implementations, for the dynamic mode of Kalman filter 750, the velocity and turn rate are not set to zero and the heading is not fixed (e.g., they retain their values as input in block 820, such as from the GNSS data and the non-GNSS motion data). In block 840 in some implementations, the coordinate data output based on the updated predictive model of block 830 or block 835 may be stored in memory, and in some implementations, may be sent to the geomapping server as shown in block 850.

In some implementations, the Kalman filter assigns different weights to the data inputs (e.g., GNSS data and non-GNSS motion data) based on an uncertainty matrix calculated to minimize a probabilistic prediction model. For example, if the mobile location device is under a bridge and the GPS signal is poor (as indicated by CN0, the Carrier to Noise Density data value) the Kalman filter may assign a lower weight to the GNSS data and a higher weight to the MEMS data for purposes of calculating the coordinate data of the mobile location device. In some implementations, when the Kalman filter is operating in the constant position mode (e.g., due to the velocity below a predetermined threshold) and the GNSS data consistency exceeds a predetermined consistency level (e.g., has a low associated uncertainty), the Kalman filter may revert to dynamic mode even where the vehicle velocity is less than the threshold velocity. In some implementations, the Kalman filter determines that the GNSS data consistency exceeds a predetermined consistency level by examining latitude and longitude data provided by the GNSS module. In some such implementations, if a threshold quantity of sequential latitude and longitude data points (or latitude and longitude data points over a given period of time) from the GNSS module indicate that the vehicle is moving, the Kalman filter may determine that GNSS data should be trusted and the Kalman filter should return to the dynamic mode (e.g., the first mode). In some implementations, the Kalman filter can remain in the reverted dynamic mode for a predetermined period of time or the GNSS data consistency falls below a predetermined consistency level. The Kalman filter can be kept in the dynamic mode from the constant position mode based on other suitable triggering event.

The Kalman filter may generate coordinate data that includes a timestamp, latitude, longitude, and ellipsoidal height. Other suitable outputs can be calculated based on the location data input. In some implementations, the Kalman filter may generate coordinate data with fewer data items.

In some implementations, obtaining a single coordinate data point may be sufficient for location detection purposes. In some implementations, process 800 may operate in a loop as depicted in FIG. 8, thereby maintaining state variables and other values such as weightings of the Kalman filter thereby maintaining a track on current position and eliminating a startup initialization time for the filter to reestablish its state variables and other values the next time it is needed to calculate estimated location data. Such an initialization process is not described in detail, but in some implementations, it may be expressed as a minimum number of cycles (loops) of process 800. As noted above, in block 850, the processor of the mobile location device may transmit the coordinate data point to a local system or module or to a remote system, such as a geomapping server as shown, to use the coordinate data determined by the mobile location device 10. In some implementations, such transmission of coordinate data output from the Kalman filter process may occur on every point, or some other interval of calculated data points or time (e.g., every other data point, every fifth, data point every 20 secs, etc.). In some implementations, such transmission may be based on a query for a current position received by the processor. In some implementations, such transmission may be based on a trigger event, such as a detected velocity of zero indicating a stopped condition, or a system states such as a velocity below a certain threshold value (e.g., as discussed at block 825). In some implementations a predetermined number of data points may be sent in response to a trigger event, e.g., 5 data points, 10 data points, or some other suitable number of data point. In some implementations, a combination of an intervals, queries, trigger events, and/or system states may be used to transmit current coordinate data.

It should be appreciated that the high accuracy location detection of the mobile location devices may not have GNSS data available for the location detection in some implementations. While not shown, the process 800 of determining the geographic position of the mobile location device may use other sources of location data. For example, low energy wireless beacons may be installed throughout a geographic region. These low energy wireless beacons may broadcast location information similar to the GNSS data obtained from satellites. In one implementation, one or more location beacons may be installed in a parking garage, or at an energy dispensing station. Thus, when the mobile location device enters such a station and other sources of location data are lost, the mobile location device can receive the location data broadcasts from the one or more beacons to determine that the mobile location device is at a particular energy dispensing station. Similarly, cellular tower triangulation and IEEE 802.11 (wifi) triangulation can be used when other location data signals are unavailable.

It should be appreciated that a low cost, but high accuracy location detection can be used in a number of different systems that required geographic position information. In some implementations, as noted above, an automated energy dispensing and payment system may require a high accuracy location detection to determine whether a mobile location device is in a geolocated zone associated with a particular energy dispensing device. In some implementations, an automated parking and payment system may require a high accuracy location detection to determine whether a location device is parked in a legal parking zone. In some implementations, the high accuracy location detection is useful for improved direction systems to avoid providing incorrect directions (the more accurate position information can be supplied to a mobile phone's mapping application to obtain better directions). In some implementations, the mobile location device can be installed in corporate vehicle fleets to collect and provide accurate data for managing the vehicle fleets. In some implementations, an automated curbside pickup system may require a high accuracy location detection to determine whether a location device is located in particular geolocated pickup zone. In some implementations, the mobile location device can interact with toll pass systems to provide toll payments and reduce the quantity of devices a user must maintain in a vehicle. In some implementations, the mobile location device and the high accuracy location detection system may track a variety of different data points about a vehicle's use for insurance data analytics. The above list of uses for the high accuracy location detection system and method are merely examples and other suitable users are contemplated.

For purposes of further discussion, FIGS. 9-15 will describe in greater detail, some implementations that apply the use of a low cost and high accuracy location detection system.

Figure 9:
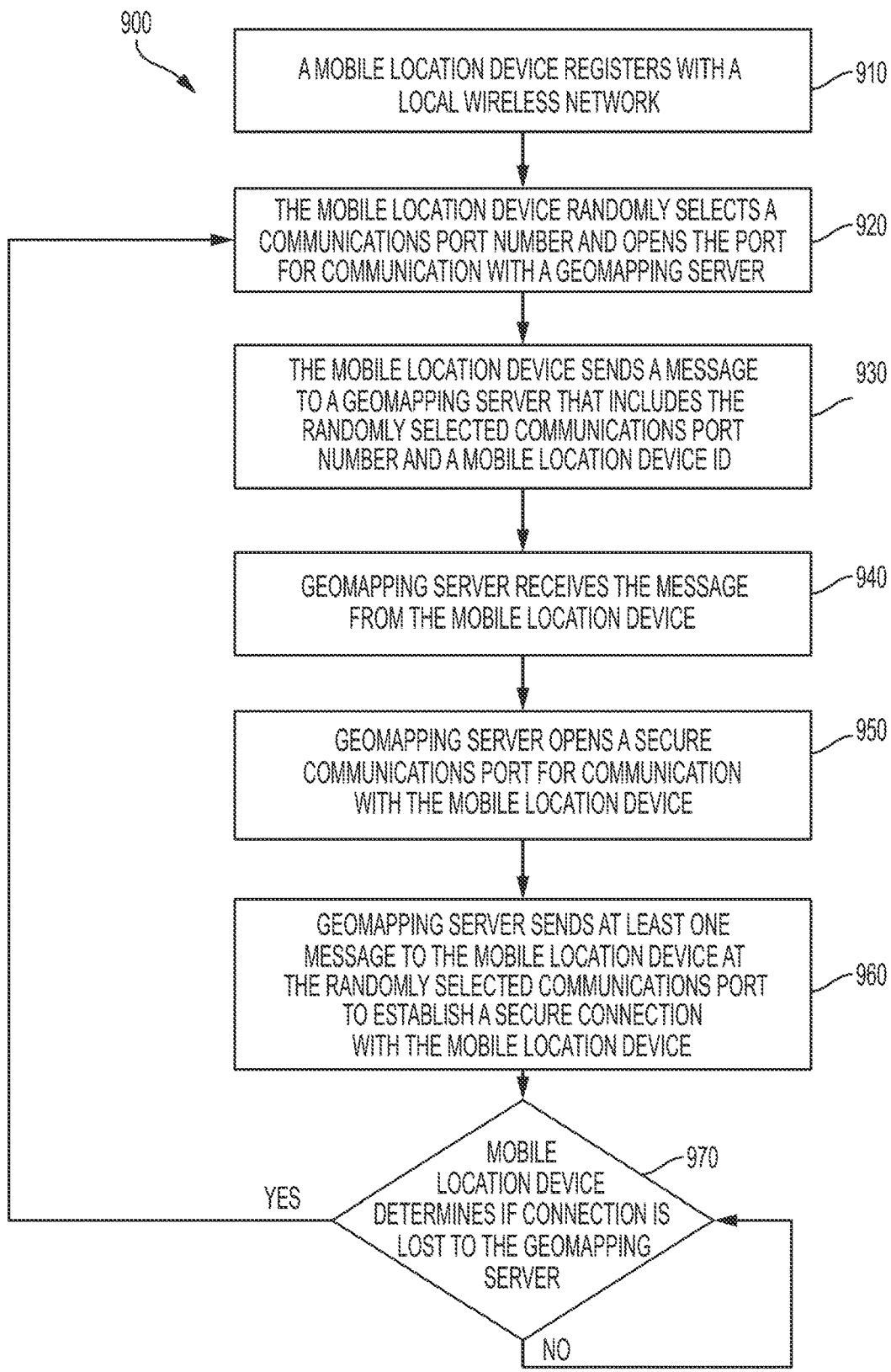
FIG. 9 is a flowchart that depicts some implementations of the mobile location device connecting with a geomapping server for secure communications.

FIG. 9 is a flowchart that depicts some implementations of the mobile location device 10 connecting with a geomapping server in data center 120 for secure communications in process 900. For security purposes, prior to process 900 starting, a mobile location device 10 may be assigned and configured with certain identifying information such as a private Internet Protocol (IP) address, a device ID, a subscriber identification in a subscriber identification module (SIM) chip (or eSIM), and information on how to contact the geomapping server. The geomapping server or some related server or database is configured to store the assigned private IP address and SIM chip information associated with the mobile location device for later verification during the registration and communication processes.

At block 910, a mobile location device (such as mobile location device 10) registers with a local wireless network (such as mobile network 110). In some implementations, this may occur automatically when the mobile location device is powered on or when a user presses a button on the mobile location device. In some implementations where the mobile location device operates on a GSM network, the mobile location device may execute an international mobile subscriber identity (IMSI) attach procedure. However, any suitable registration procedure may be employed to register the mobile location device with the local wireless network.

In one implementation, the local wireless network is configured to recognize some unique identifying information associated with the mobile location device to know that communications traffic from the mobile location device should be routed in a predetermined manner to the geomapping server. In one such implementation, a VPN tunnel is setup by the local wireless network to carry communications traffic from the mobile location device to a geomapping server in data center 120.

In some implementations, once the connection to the local wireless network has been established, the mobile location device randomly (or pseudo randomly) selects a logical socket communications port number (e.g., one of the transmission control protocol (TCP) port numbers) and opens the randomly selected port for communication with a geomapping server in block 920. In some implementations, only the mobile location device initially knows the randomly selected communications port number. In this manner, if the mobile location device receives messages or other communications requests on other communication port numbers, the mobile location device will know that such communication requests are unauthorized. In some implementations when the unauthorized communications requests are received at the unselected communication port numbers, the mobile location device may turn off all communications on all ports as a way to prevent hacking attempts, denial of service attempts, or other unwanted intrusions or communications.

In some implementations, the mobile location device sends a message at block 930, through the mobile network (e.g., the local wireless network), to the geomapping server that includes the randomly selected communications port number, mobile location device ID. It should be appreciated that in some implementations, a different set of information may be sent to the geomapping server to establish a connection, such as a SIM chip ID (or eSIM ID), and private IP address. As noted above, message at block 930 may be sent through the mobile network through a VPN. The VPN encrypts the traffic communication between the mobile location device and the geomapping server and keeps other hosts or endpoints on the mobile network from discovering the mobile location device or geomapping server (e.g., from brute force pings to sets or subnets of IP addresses). However, in some implementations, the communications traffic between the mobile location device and the geomapping server on the mobile network may not be through a VPN. In some implementations, the mobile location device and geomapping server may encrypt communications traffic sent through the mobile network or may send the communications without encryption.

At block 940, the geomapping server receives the message from the mobile location device through at least the mobile network in some implementations. At block 950, the geomapping server may open a secure communications port (e.g., a TCP port) for communication with the mobile location device through at least the mobile network. In some implementations, the geomapping server may also communicate with a user device (e.g., user device 140) over an Internet connection (e.g., through Internet 130).

In some implementations, the geomapping server sends, through the mobile network, at least one message to the mobile location device at the randomly selected communications port to establish a secure connection with the mobile location device, as illustrated in block 960.

In some implementations, the processor of the mobile location device determines if a connection is lost to the geomapping server or lost with the local wireless network (e.g., the mobile network) as illustrated in block 970. For example, the mobile location device may send a ping message to the geomapping server after a predetermined amount of time has elapsed. In some implementations, the pings may be repeated until the power is cut to the device or until a user actively terminates the mobile location device's connection to the geomapping server. If the mobile location device determines that the connection is lost to the geomapping server or lost with the local wireless network, the process 900 may return to either block 910 or 920, depending on which connection is lost. In the illustrated implementation of FIG. 9, the connection to the geomapping server is lost so the mobile location device starts process 900 again at block 920 to reestablish a connection with the geomapping server. It should be appreciated that in some implementations, the process of reestablishing a connection is a manual process that must be executed by a user of the mobile location device. For example, the user must press a button on the mobile location device to start or restart process 900. In some implementations, where the mobile location device directly communicates with user device 140 (via USB or a low energy wireless connection), a user may cause user device 140 to issue commands to the mobile location device to start or restart any part of process 900.

As noted above, process 900 is not restricted to any particular system and can be employed with any device attempting to establish a connection with a remote server.

Figure 10A:
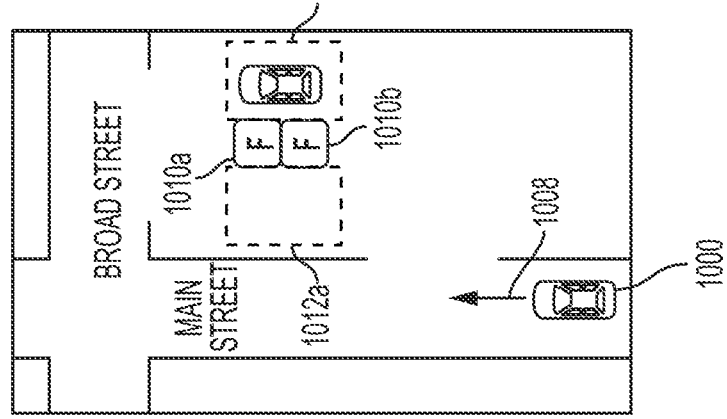
Figure 10B:
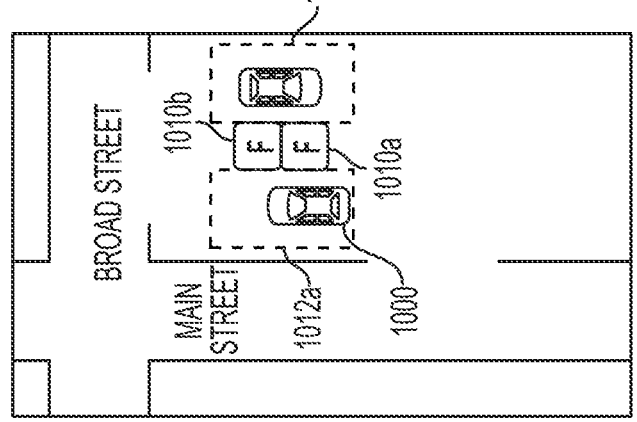
Figure 10C:
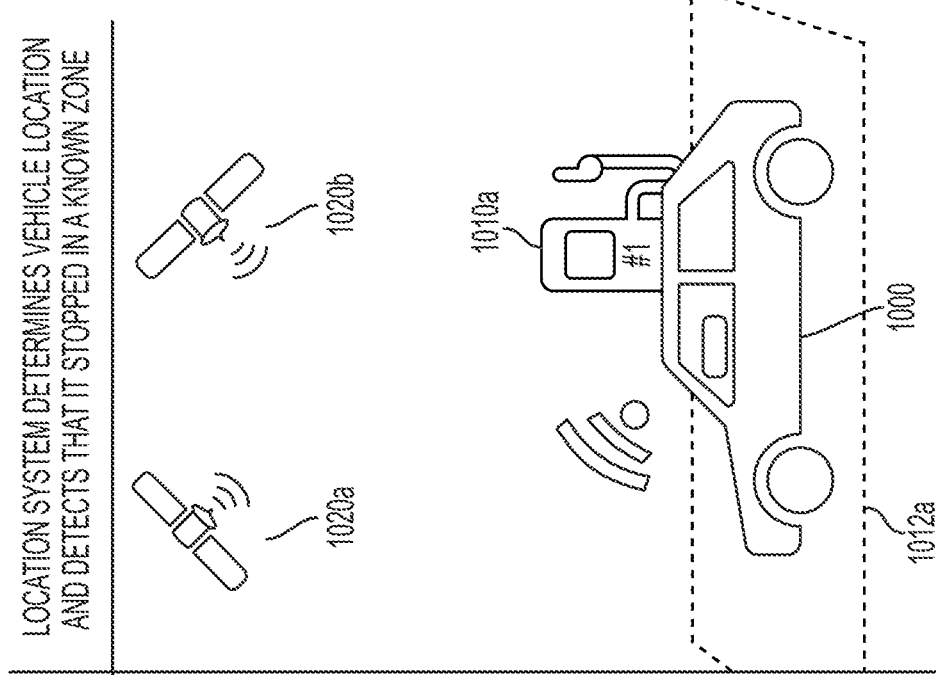

FIGS. 10A, 10B, 10C, 10D, 10E, and 10F are illustrations of some implementations using the high accuracy location detection in an energy dispensing (e.g., gas, diesel, compressed natural gas, hydrogen, electricity, etc.) and payment system. In some implementations, an energy dispensing session for a vehicle may be triggered upon a vehicle slowing to below a predetermined velocity threshold in a geographic location that is associated with an energy dispensing zone (e.g., a geolocated zone adjacent to a fuel pump or charging station). In some implementations, an energy dispensing session may be completed upon a completion of a payment transaction for dispensed energy, such as transmission of a receipt to a user device as a record of the purchase and payment. In some implementations, the user (e.g., user 245) places a mobile location device (e.g., mobile location device 10) in the vehicle 1000 (not shown). In some implementations, vehicle 1000 is equipped with a mobile location device (e.g., mobile location device 10 is an embedded device). In some implementations, the mobile location device registers with a local wireless network and establishes a connection to a geomapping server as discussed above in FIG. 9. In the scenario illustrated in FIG. 10A, the vehicle 1000 drives along Main Street in direction 1008 to what may visually appear to be an available energy dispensing device 1010*a* and an occupied energy dispensing device 1010*b*. In FIG. 10B and FIG. 10C, the vehicle 1000 pulls up to energy dispensing device 1010*a*, and the mobile location device therein may continually determine the vehicle 1000's location using data streams from satellites 1020*a* and 1020*b* (and along with other location data streams, such as from VMD and/or MEMS data discussed above). In some implementations, a slowing of the mobile location device in vehicle 1000 to less than a predetermined velocity threshold, triggers a message from the mobile location device to a geomapping server (not shown). In some implementations, the mobile location device transmits one or more location data points in response to the trigger, such as five, ten, one or some other suitable number of location data points, whereupon receipt thereof, the geomapping server determines from the one or more received location data points that vehicle 1000 is in geolocated zone 1012*a* associated with energy dispensing device 1010*a*, e.g., pump #1. In some implementations, mobile location device continually sends location data points to a geomapping server, wherein the location data points comprise velocity data, and the geomapping server makes a determination that the vehicle 10 has slowed to a velocity below the predetermined velocity threshold, whereupon geomapping server makes the aforementioned determination of that vehicle 1000 is in zone 1012*a* associated with energy dispensing device 1010*a*. Geolocated zone 1012*b* is associated with energy dispensing device 1010*b*, e.g., pump #2, which was occupied when vehicle 1000 entered the energy dispensing station.

Referring now to FIGS. 10D-10F, in some implementations, upon the determination that vehicle 1000 is located in zone 1012*a* associated with energy dispensing device 1010*a* (pump #1), the geomapping server sends a message to a user device (e.g., user device 140) to display a message 1030 on user device 140 to prompt the user to confirm they are at pump #1 and want to dispense energy therefrom. In some implementations, where the server did not correctly determine the pump location for the user's vehicle (e.g., due to an error in the location detection), the user may provide a response to correct the pump number (e.g., the user can send back to the server that the user is at pump #2). Upon such confirmation (e.g., the pump number is correct or an updated pump number), in some implementations, the geomapping server may confirm to the user via a display message sent to user device 140, a successful payment authorization and pump activation and a prompt to the user to begin being fueling, as shown in display message 1032 on user device 140 in FIG. 10E. In some implementations, a display message 1032 is not sent to user device 140. In some such implementations, the activation of the energy dispensing device can be sufficient notice to the user to begin dispensing. In some implementations, upon a termination of the user refueling operation, the server may receive from a payment processing system notice of a payment receipt for the refueling operations, which may signify that the refueling operation is complete and payment has been made for the refueling operation. The server may store the payment receipt and transmit a purchase receipt to the user device as shown in display message 1034 on user device 140 in FIG. 10F.

Figure 11:
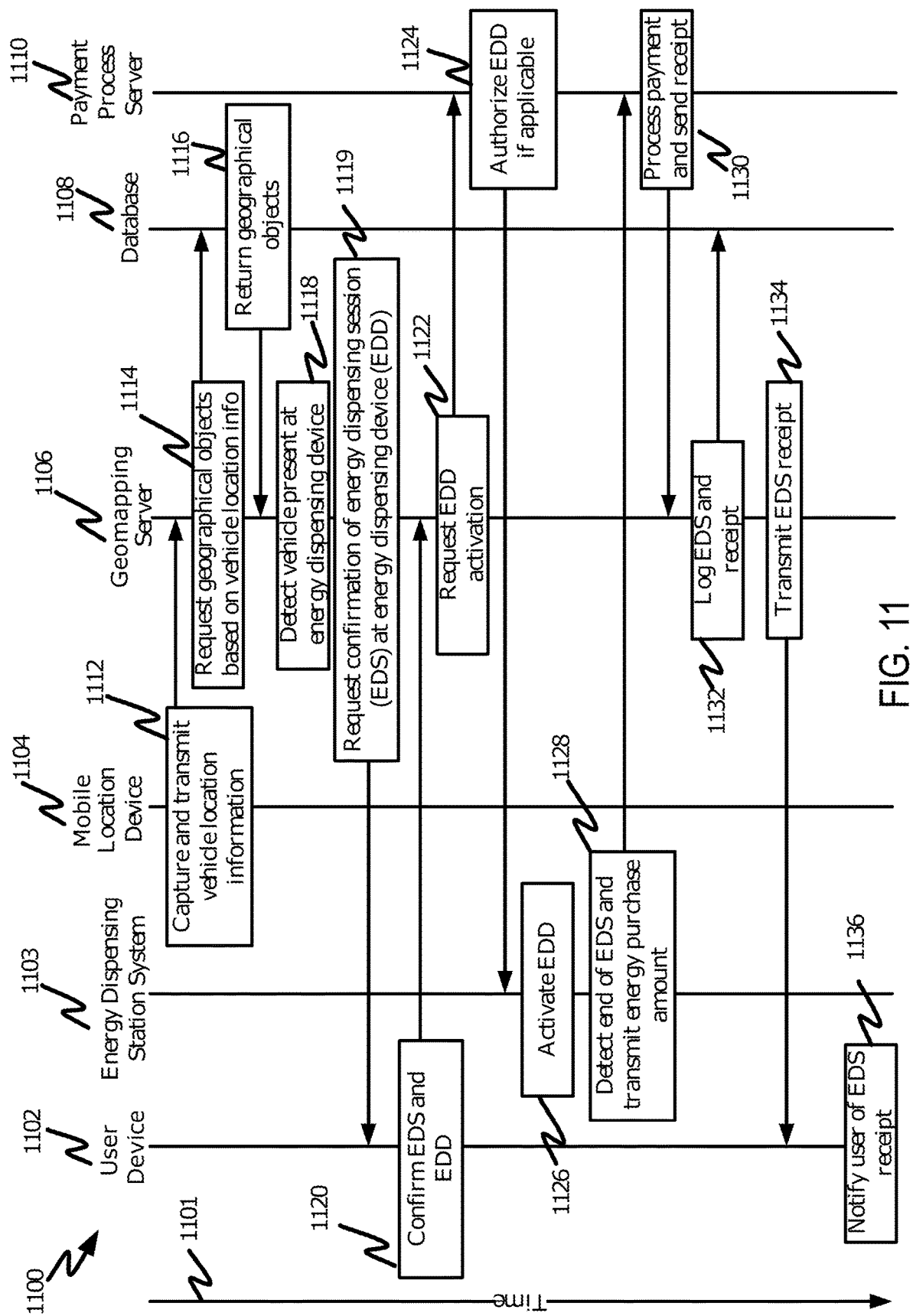
FIG. 11 illustrates some implementations of a time-domain transaction diagram showing the operational processes and communication between certain elements of the disclosed system.

FIG. 11 illustrates some implementations of a time-domain transaction diagram 1100 showing the operational processes and communication between certain elements of the automated energy dispensing and payment system using a high accuracy location detection system over time 1101. The diagram illustrates a plurality of elements such as a user's user device 1102, energy dispensing station system 1103, mobile location device 1104, a geomapping server 1106, a database 1108, and a payment processing server 1110 and how these elements interact over time 1101 to provide a user with a novel automated energy dispensing and payment system. It should be appreciated that the various elements in diagram 1100 correspond to elements previously discussed. As with FIGS. 10A-10F, this diagram of FIG. 11 assumes that the mobile location device 1104 is in a vehicle (e.g., a removable transponder or embedded system in the vehicle), the user's user device 1102 is in communication with the geomapping server 1106, and mobile location device 1104 is also in communication with a geomapping server 1106.

Block 1112 illustrates that mobile location device 1104 transmits vehicle location information to geomapping server 1106. In some implementations, the mobile location device 1104 transmits the vehicle location information to the geomapping server 1106 when the mobile location device 1104 detects a lack of motion of the vehicle. The lack of motion may include no motion or motion less than a predetermined speed (e.g., less than 2 km per hour, or some other suitable speed) and triggers the mobile location device 1104 to send location data captured as discussed above to geomapping server 1106. In some implementations, mobile location device 1104 obtains a predetermined quantity of coordinates of the mobile location device over a predetermined quantity of time. In some implementations, the mobile location device 1104 obtains and generates a single location coordinate of the vehicle and sends the obtained location coordinate to the geomapping server 1106. In some implementations, the mobile location device 1104 obtains location coordinates every second for 5 seconds or for some other suitable interval. It should be appreciated that geomapping server 1106 corresponds to the previously mentioned geomapping server and may be located in data center 120. It should also be appreciated that geomapping server 1106 may represent one or more such servers that may be in one data center or spread across multiple different data centers. In some implementations, the mobile location device 1104 constantly sends location data to the geomapping server 1106 regardless of a triggering event (e.g., detecting a speed below a predetermined threshold). The geomapping server 1106 may use this constantly sent location data information for different purposes such as alerting a user device 1102 regarding a potential low fuel event and providing available fueling station locations based on the user's location data sent to the geomapping server 1106. The location data constantly sent to the geomapping server 1106 may also be used for other purposes, such as providing targeted advertising based on a vehicle's location determined at a geomapping server 1106. In some such implementations, the mobile location device 1104 may send a specialized message to the geomapping server 1106 to distinguish the location data captured after a triggering event (e.g., speeds below a threshold value) from routine and constant location data that the mobile location device 1104 sends to the geomapping server 1106.

In some implementations, when geomapping server 1106 receives the vehicle location information, the geomapping server 1106 may request geographical object or geographical zone information from database 1108 based on the vehicle location as shown at block 1114. In some implementations, the database 1108 returns geographical object information to the geomapping server 1106 as shown in block 1116. The geomapping server 1106 may compare the geographical object information to the vehicle location information to determine whether the vehicle is present at an energy dispensing device (e.g., a fuel pump, recharging station, etc.), as shown in block 1118. For example, the geomapping server 1106 may compare one or more of the received coordinates with coordinates stored in database 1108 to determine if the vehicle location information corresponds with a stored energy dispensing zone. In some implementations, a stored energy dispensing zone are predefined geographical coordinates that describes an area that is at or near to an energy dispensing device (e.g., an area close enough to connect a fuel pump and add fuel into a vehicle or an area close enough to connect a plug from an electric vehicle charger or electrical charging station to a plugin electric vehicle). In some implementations, the stored energy dispensing zones (e.g., graphical objects) are defined as geolocated polygons in a database. In some implementations, the geolocated polygons are stored with embedded metadata that enable the automated energy dispensing session. For example, a geolocated polygon next to a fuel pump 1 may have associated metadata that defines the fuel pump as fuel pump 1 (as opposed to fuel pump 2 or fuel pump 3), the address of fuel station, name of the fuel station, and/or other suitable information that may be necessary to activate the fuel pump and automatically process payment for fuel obtained from the fuel pump.

In some implementations, the geomapping server 1106 employs a two-factor authorization system to confirm that an energy dispensing session should begin and that a particular energy dispensing device should be activated to dispense energy (e.g., gasoline, diesel, hydrogen, electricity, etc.) to refuel/recharge a vehicle. In some implementations, the first factor is the vehicle location detection of block 1118. In some implementations, the second factor is user confirmation that an energy dispensing session should begin and that a particular energy dispensing device should be activated. In some implementations, if the geomapping server 1106 determines that the coordinates received from mobile location device 1104 result in a match to an energy dispensing device zone, the server may send a request to user device 1102 to request confirmation that a user wishes to start an energy dispensing session (e.g., charging an electric vehicle at an electric vehicle charger, pumping fuel from a fuel pump, etc.) as shown in block 1119. In some implementations, the request to the user device 1102 may also request confirmation that the mobile location device 1104 (e.g., the vehicle) is located at a particular energy dispensing zone (e.g., within proximity to a particular energy dispensing device to obtain a relevant energy source) as also shown in block 1119.

In some implementations, as shown in block 1120, the user device 1102 may transmit a confirmation message back to geomapping server 1106 confirming that the mobile location device 1104 is located at a particular energy dispensing device and the user wishes to start an energy dispensing session. In some implementations wherein the user determines that the energy dispensing device is incorrect, user device 1102 may transmit a message to geomapping server 1106 to indicate a different energy dispensing device (e.g., that the vehicle is located by fuel pump 3 rather than fuel pump 1). In some implementations, the confirmation request communication between the geomapping server 1106 and the user device 1102 (e.g., a mobile phone, infotainment system, etc.) may occur through an application on user device 1102. In some implementations, the confirmation request communication between the geomapping server 1106 and the user device 1102 may occur through short message service (SMS) between the user device 1102 and the geomapping server 1106. It should be appreciated that the confirmation request communication can be handled using other suitable communication exchanges. In some such implementations where user device 1102 transmits corrected energy dispensing device zone information (e.g., fuel pump 3) to geomapping server 1106, the geomapping server 1106 may use the corrected energy dispensing device zone information in subsequent actions to authorize and activate the energy dispensing session. It should be appreciated that in some implementations, the confirmations as discussed in block 1119 and block 1120 can be skipped such that a user is not required to confirm. That is, in some implementations, after detecting that a vehicle is present at an energy dispensing device in block 1118, the geomapping server 1106 may move to block 1122 without the confirmations discussed in block 1119 and block 1120. In some implementations, a different second factor authentication can be used in place of block 1119 and block 1120 such that the user need not provide a confirmation.

In some implementations, as shown in block 1122, the geomapping server 1106 may request activation of an energy dispensing device to payment process server 1110. For example, if the vehicle is located at a gas fuel pump, the geomapping server 1106 may send payment information to a payment process server 1110 (e.g., user information, credit card/debit card information, payment token information, etc.). In some implementations, the geomapping server 1106 may store payment information associated with the user of the vehicle. The geomapping server 1106 may also send a request to the payment process server 1110 to activate a particular energy dispensing device (e.g., energy dispensing station name, energy dispensing station address, particular energy dispensing device, etc.).

In some implementations, the payment process server 1110 may determine whether the user's payment information would permit payment for an energy dispensing session (e.g., determine if a credit card or other suitable payment information is authorized and has enough money to complete a transaction). While not shown, in some implementations, the payment processor may communicate with a credit card system or debit card system to determine whether a particular transaction is authorized before proceeding. In some implementations, if the payment process server determines that the payment information is suitable, the payment process server 1110 may transmit a message to authorize activation of a particular energy dispensing device as shown in block 1124. In some implementations, if the payment process server 1110 determines that the payment information is not valid for an energy dispensing transaction, payment process server 1110 may transmit a message to the geomapping server 1106 indicating that the transaction for an energy dispensing session is not authorized. In some implementations, the geomapping server 1106 may transmit a notice that the transaction for the energy dispensing session was not authorized to the user device 1102.

In some implementations, the energy dispensing station system 1103 activates the energy dispensing device in block 1126, in response to the payment processor server sending a payment authorization for the dispensing of a purchase at the energy dispensing device. It should be appreciated that the activation of the energy dispensing device in block 1126 may be sufficient prompting for the user to begin dispensing. In some implementations, additional user prompting may be given, wherein the payment process server 1110 also notifies the geomapping server of the authorizations (not shown), and the geomapping server 1106 sends user device 1102 a message to display a prompt similar to the example display message 1032 of FIG. 10E.

In some implementations, in the energy dispensing system 1103 detects a termination of energy dispensing in block 1128, such as may be indicated by a return of a fueling nozzle or charging plug from the vehicle to the energy dispensing device, whereupon energy dispensing system 1103 may transmit purchase details to the payment processing server 1110. In some implementations, payment process server 1110 may process payment based on the purchase details provided by the energy dispensing station system 1103. In some implementations, payment process server 1110 may send purchase, payment and confirmation details to the geomapping server 1106. Geomapping server 1106 may in some implementations, write to database 1108, a transaction log of the energy dispensing session including such details as user ID, mobile location device ID, user device ID, energy dispensing device ID, energy dispensing station ID, payment processor transaction number and confirmation, time stamps for one or more of the steps such as session start and end times, authorization and payment transaction times, purchase and payment details including a payment transaction receipt, and the like. It should be appreciated that in some implementations more or fewer details may be logged.

In some implementations, geomapping server 1106 transmits, in block 1134, an energy dispensing session purchase and payment transaction receipt to user device 1102 which may then, in some implementations, in block 1136, notify the user, via one of various methods, such as a push notification from a downloaded app, an SMS message, a display message, an email, and the like. In some implementations, the energy dispensing device may also print a purchase and payment transaction receipt (not shown).

Figure 12:
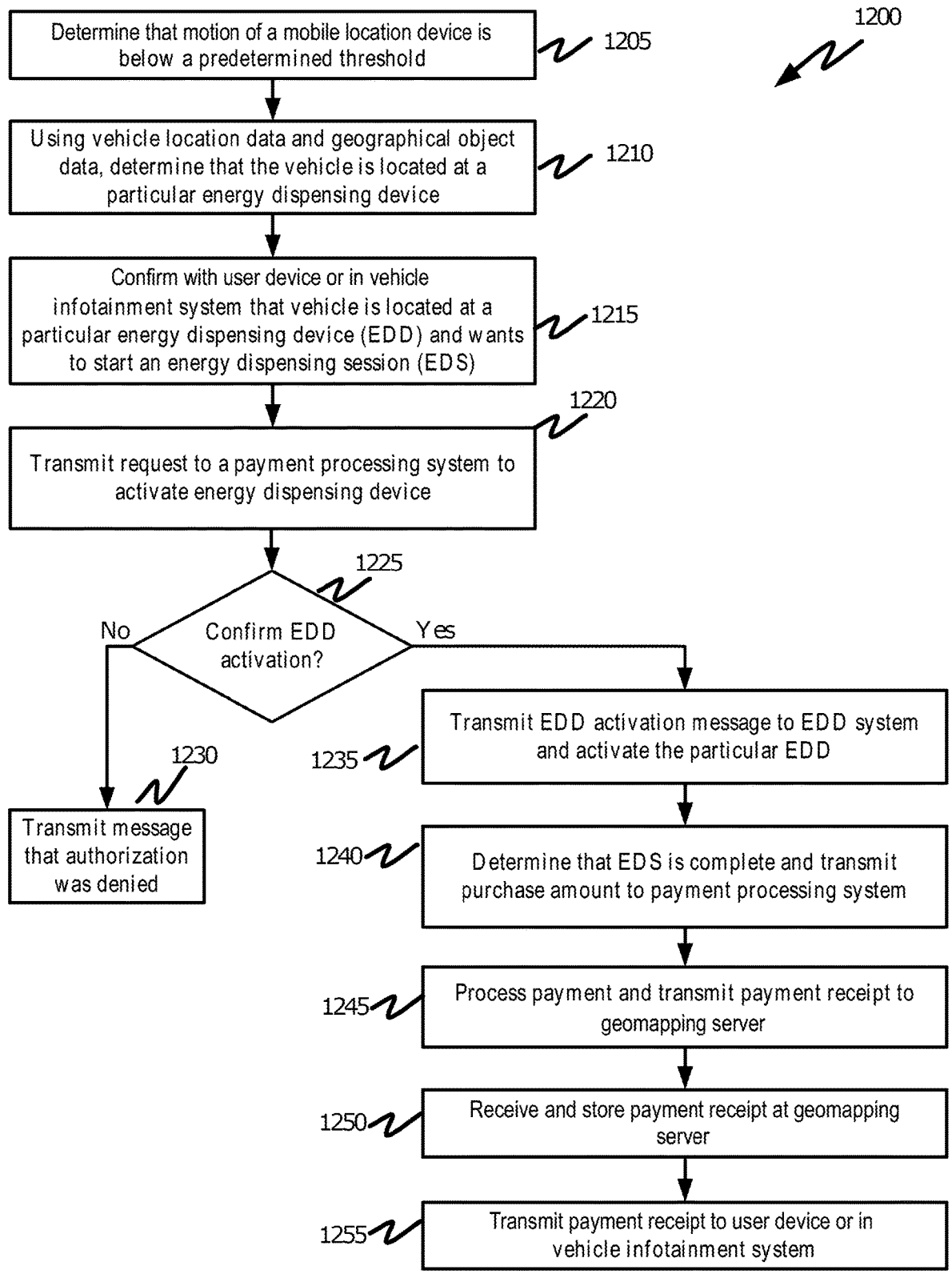
FIG. 12 is a flowchart that illustrates some implementations of the system and method for automatically detecting and processing an energy dispensing session.

FIG. 12 is a flowchart of process 1200 that illustrates some implementations of the system and method for automated energy dispensing and payment system using a high accuracy location detection system, such as described in FIG. 11 blocks 1112-1136. In some implementations, at block 1205, the mobile location device determines, with a processor, that motion of the mobile location device has dropped below a predetermined threshold, such as a velocity is less than a predetermined threshold velocity, whereupon a trigger event may be generated and a vehicle location message may be sent from the mobile location device to the geomapping server as described above for block 1112 of FIG. 11, wherein some implementations for the process of acquiring the location data points was described in connection with FIG. 7 and FIG. 8. In some implementations, at block 1210 the geomapping server determines, using the location data and geographical object data that the vehicle is located at a particular energy dispensing device, as described in blocks 1114 and 1116 above. At block 1215, in some implementations effects a two factor authentication by in addition to the received location data, the geomapping server prompts the user, via the user device (e.g., smartphone, infotainment system, etc.) to confirm the vehicle is located at the determined particular energy dispensing device, and confirms the user wishes to begin fueling, as described above in blocks 1119 and 1120. In some implementations, in block 1220, the geomapping server request from a payment processing system activation of the particular energy dispensing device as described above in block 1122, wherein the payment processor may in some implementations preauthorize the payment for a certain amount as described above in block 1124, and when successfully authorized, activate the energy dispensing device (as in block 1126 above). In some implementations, in block 1225, the geomapping server may check to see if the payment authorization was successful and activation of the energy dispensing device is therefore authorized. If not, in some implementations, process 1200 may proceed to block 1230 and transmit a message to the user device indicating the authorization was denied. If the activation is confirmed/authorized in block 1225, the process proceeds to block 1235, wherein the energy dispensing device is activated as described above in block 1126. In some implementations, in block 1240, the energy dispensing is determined to be complete as described above in block 1128, whereupon in some implementations, purchase details are sent to the payment processor for completion of the payment process. In some implementations, as shown in block 1245, the payment processor may send a receipt to the geomapping server, as described above in block 1130. In some implementations, as shown in block 1250, the geomapping receives and stores/logs the payment receipt/transaction details, as described above in block 1132. Process 1200 then proceeds to block 1255, wherein the geomapping server transmits a purchase and payment transaction receipt to the user device (e.g., smartphone or infotainment system) as described above in block 1136.

FIGS. 10A-12 disclosed a novel system and method for an automated energy dispensing and payment system using a high accuracy location detection system. FIGS. 13A-15 disclose a novel system and method for an automated parking and payment system using a high accuracy location detection system. FIGS. 13A, 13B, 13C, 13D, 13E, and 13F are illustrations of some implementations using the high accuracy location detection in a parking and payment system. A parking session for a vehicle is started in a geographic location that is associated with a legal parking zone and then the parking session is stopped when the vehicle leaves the parking zone. The user places a mobile location device (e.g., mobile location device 10) in the vehicle 1300 (not shown). The mobile location device registers with a local wireless network and establishes a connection to a geomapping server as discussed above in FIG. 9. As noted above, the mobile location device can alternatively be an embedded system with the vehicle 1300. With the mobile location device, the user can drive in a city with legal parking zones (See, for example, FIG. 13A, available parking spot 1310). The vehicle 1300 drives along K street in direction 1308 to what visually appears to be an available parking spot 1310. In FIG. 13B, the vehicle 1300 parks in available parking spot 1310. In some implementations, the mobile location device automatically determines that the vehicle may be parked or the user presses a button on the mobile location device to inform the mobile location device to check on the parking zone. In some implementations, the mobile location device in vehicle 1300 determines the vehicle 1300's location using data streams from satellites 1320*a* and 1320*b* (and along with other location data streams discussed above).

After communicating with a geomapping server (not shown) the geomapping server determines that vehicle 1300 has arrived in a legal parking zone (FIG. 13C). In some implementations, after a preset amount of time or after a manual action by the user (activating button on the mobile location device), the mobile location device sends a request to the geomapping server to start a parking session. If the geomapping server determines that a parking session successfully started, the geomapping server alerts the mobile location device in some implementations. As illustrated in FIG. 13D, in some implementations, the mobile location device changes an LED on the mobile location device (turns it green or flashes the LED) to inform the user that a parking session has started. In some implementations, the geomapping server sends information about expiration time, rate and hourly limit back to the mobile location device (when the mobile location device includes a display screen), to a mobile application on user device associated with the user, via other suitable methods of communication with the user, or some combination of the foregoing. In some implementations where the mobile location device includes a display, the mobile location device may display the expiration time: for example, assuming that the zone has a 2-hour limit and now is 11:23 AM, the display will read, "EXPIRES AT 1:23 PM" (not shown). At some point between 11:23 AM and 1:23 PM the user returns to the vehicle 1300 and starts driving away in direction 1312 (FIG. 13E) from the parking spot. In some implementations, the mobile location device automatically detects movement (e.g., movement greater than 5 miles per hour using the GNSS module or some other suitable speed) and the mobile location device sends a request to the geomapping server to end the parking session.

In one such implementation, the geomapping server stops the parking session, processes payment for the parking session (when required), and sends a payment receipt 1330 to the user (FIG. 13F).

Figure 14:
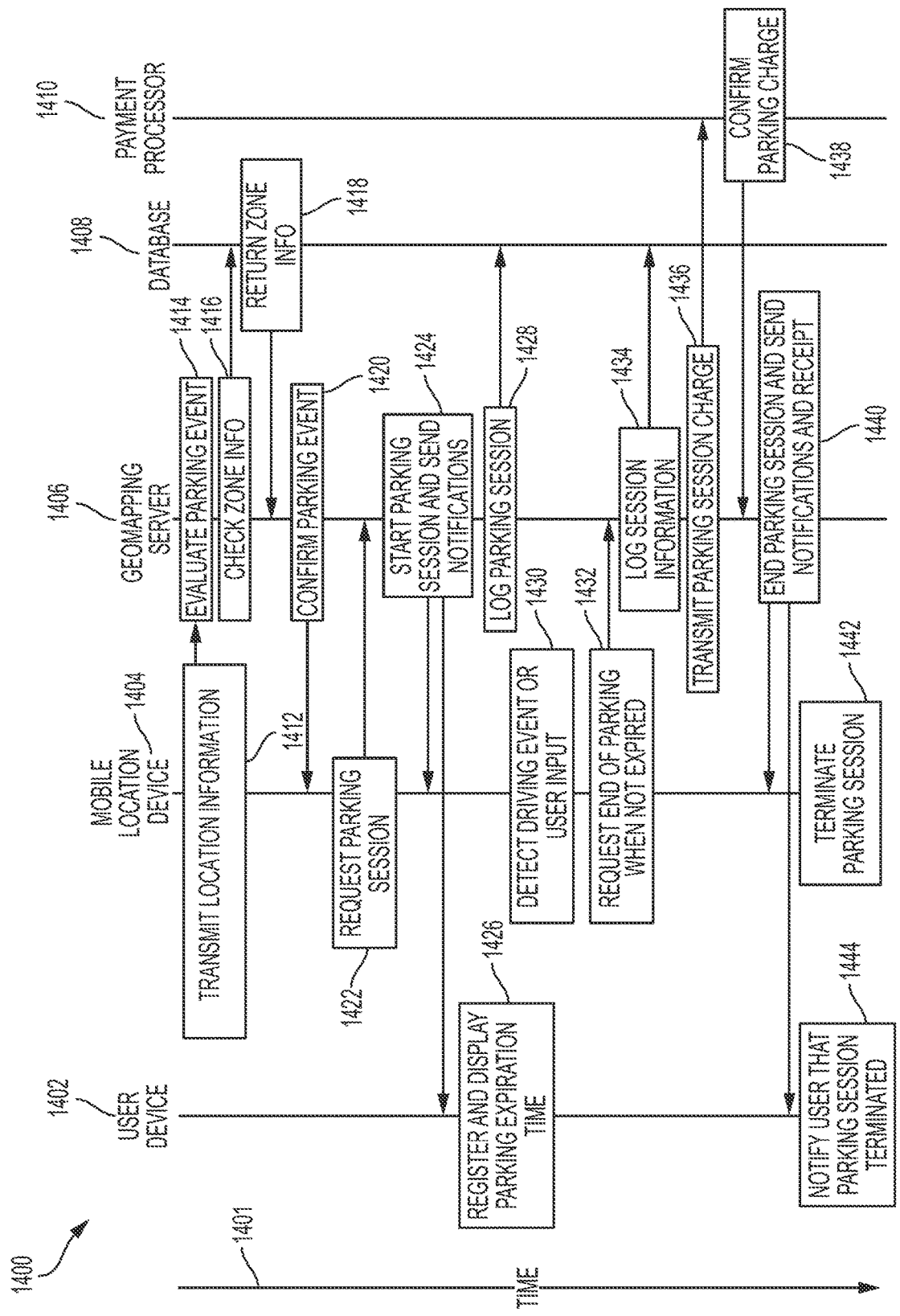
FIG. 14 illustrates some implementations of a time-domain transaction diagram showing the operational processes and communication between certain elements of the disclosed system.

FIG. 14 illustrates some implementations of a time-domain transaction diagram 1400 showing the operational processes and communication between certain elements of the parking and payment system using a high accuracy location detection system over time 1401. The diagram illustrates a plurality of elements such as a user's user device 1402, mobile location device 1404, a server 1406 (e.g., a geomapping server), a database 1408 storing, among other things, geographical objects, and a payment processing server 1410 and how these elements interact over time 1401 to provide a user with a novel parking and payment system. It should be appreciated that the various elements in diagram 1400 correspond to elements previously discussed. As with FIGS. 13A-13F, this diagram of FIG. 14 assumes that the mobile location device 1404 is in a vehicle, the user's user device 1402 is in communication with the server 1406, and mobile location device 1404 is registered with a local wireless network and has established a connection to a server 1406 as discussed above in FIG. 9.

Block 1412 illustrates that mobile location device 1404 detected a lack of motion and sends a message to server 1406. In some implementations, the message to server 1406 may include location information/data. In some implementations, the message may include a request for an evaluation of a parking event from server 1406. In some implementations, the request may be in the form of a specialized message (e.g., a check message). The lack of motion may include motion less than a predetermined speed (e.g., less than 2 km/hour, or 5 km/hour or some other suitable predetermined velocity threshold) and triggers the mobile location device 1404 to obtain location data as discussed in FIGS. 7 and 8. In some implementations, mobile location device 1404 obtains a predetermined quantity of coordinates of the mobile location device over a predetermined quantity of time. In some implementations, the mobile location device 1404 obtains and generates 1 coordinate of the mobile location device 1404 every two seconds for 10 seconds as discussed above in accordance with FIGS. 7 and 8. Mobile location device 1404 then sends these obtained five coordinates (as part of the evaluation request) to server 1406. In some implementations, these obtained five coordinates are sent a check message to alert the server 1406 to confirm whether a particular transaction should occur (e.g., a parking session, a fueling session, etc.) It should be appreciated that server 1406 corresponds to the previously mentioned geomapping server and may be located in data center 120. It should also be appreciated that server 1406 may represent one or more such servers that may be in one data center or spread across multiple different data centers. In some implementations, the mobile location device 1404 constantly sends location data to the server 1406 regardless of a triggering event (e.g., detecting a speed below a predetermined threshold or no motion detected). The server 1406 may use this constantly sent location data information for different purposes such as alerting a user device 1402 regarding a potential low fuel event, providing available fueling station locations, etc. based on the user's location data sent to the server 1406. The location data constantly sent to the server 1406 may also be used for other purposes, such as providing targeted advertising based on a vehicle's location determined at server 1406. In some such implementations, the mobile location device 1404 may send a specialized message to the server 1406 to distinguish the location data captured after a triggering event (e.g., speeds below a threshold value) from routine and constant location data that the mobile location device 1404 sends to the server 1406.

In some implementations, mobile location device 1404 may not be able to obtain coordinate data due to a number of factors. In some such cases, mobile location device 1404 may inform the user (via an LED alert, display, or via a message to the user device 1402) that a parking session cannot be started (this process is not shown).

Returning to FIG. 14, server 1406 receives the request to evaluate the parking event 1414. The server 1406 may compare one or more of the received coordinates with coordinates stored in database 1408 to determine if any of the coordinates match with a stored legal parking zone (e.g., a legal parking zone that can be stored as a geographical object or geographical zone as discussed in connection with the energy dispensing use cases) (see blocks 1416 and 1418). In some implementations, all of the coordinates must match within a certain range to coordinates of the legal parking zone to be declared a match. In some implementations, some predetermined percentage of the coordinates received from the mobile location device 1404 must match coordinates associated with a legal parking zone stored in database 1408 before server 1406 determines that mobile location device (or the vehicle) is in a legal parking zone. In some implementations, at least one of the coordinates received should match with coordinates of the legal parking zone to be declared a match. If the server 1406 determines that the coordinates received from mobile location device 1404 result in a match to a legal parking zone, the server returns a message 1420 to mobile location device 1404 confirming that the mobile location device is in a legal parking zone. In some implementations, mobile location device 1404 does not provide information to a user regarding parking. In some such implementations, the server 1406 may send message 1420 to user device 1402. On the other hand, if the server 1406 determines that the coordinates received from mobile location device 1404 do not result in a match to a legal parking zone, the server returns a message (not shown) to mobile location device 1404 requesting a retry of the process starting at 1412, that parking is not permitted, or that the user should initiate a manual parking payment process. If the mobile location device 1404 makes too many attempts to confirm a parking event within a predetermined period of time that result in no matches to a legal parking zone, the mobile location device 1404 or server 1406 may halt further retries of the process for a predetermined amount of time. Some implementations of blocks 1412-1420 is discussed below in greater detail in FIG. 15.

In some implementations, once mobile location device 1404 receives the confirmation message 1420 that the mobile location device is in a legal parking zone, the mobile location device 1404 may request the start of a parking session as illustrated in block 1422. The mobile location device 1404 may make the request automatically to server 1406. In some implementations, the mobile location device 1404 makes the request to server 1406 after a user pushes one or more buttons on the mobile location device 1404 to send the request. In some implementations, the user may initiate the request to start a parking session from user device 1402 (not shown) in place of using mobile location device 1404 or in conjunction with mobile location device 1404. In some implementations, the mobile location device 1404 waits a predetermined amount of time before sending an automated request to start a parking session to server 1406.

For example, the mobile location device 1404 may wait one minute or some other suitable amount of time. The mobile location device 1404 may enable the user to press a button on the mobile location device to prevent the mobile location device from sending a request to start a parking session.

In some implementations, when a parking session is started, the mobile location device may shutdown or restrict power to one or more modules in the mobile location device. For example, during a parking session, the mobile location device 1404 does not require the receipt of GNSS data. As such, at the start of a parking session, the mobile location device 1404 may shutdown or restrict power to the GNSS module. It should be appreciated that the mobile location device 1404 may evaluate each module given a particular situation to determine whether the module is required for the particular situation. If the module is not required, the mobile location device 1404 will shutdown or restrict power to such modules. It should be appreciated that in some implementations, using the situational power restrictions in the mobile location device may enable the mobile location device to extend its battery life by 2 times or 3 times over its run time compared to the situation when all of the modules of the mobile location device were left running all of the time, creating a much more efficient device.

At block 1424, the server receives the request and starts a parking session associated with the mobile location device 1404 in the legal parking zone. The server may send notifications regarding the start of the parking session to the mobile location device 1404 and to the user's user device 1402. The notifications may include attributes associated with the legal parking zone such as cost per unit of time to park, the start of the parking session, the maximum time parking is permitted in the legal parking zone as shown in block 1426. In some implementations, the user can prepay for a parking session. In other implementations, payment is not made until the user terminates the parking session, the mobile location device leaves the legal parking zone, the maximum parking time has been reached, etc. In some implementations, the parking session is a pay-as-you-go model such that the user only pays for the time the mobile location device 1404 (and vehicle) are in the legal parking zone. It should be appreciated that such a system mitigates the need to guess how much parking time is required, mitigates the need to prepay for more parking time than is needed, and reduces the amount of time a user must spend attending to payment (running back to feed a meter or adding more time through an mobile phone app). At block 1428, the server also logs the parking session and start of the parking session associated with the mobile location device 1404.

In some implementations, when the mobile location device 1404 detects a driving event (e.g., MEMS module in the mobile location device 1404 detects motion greater than a predetermined amount or the GNSS module in the mobile location device 1404 detects a speed greater than a predetermined amount), the mobile location device 1404 determines that the parking session should be terminated as illustrated in block 1430. Other events may include the user pressing a button on the mobile location device 1404 to terminate the parking session or the user pressing a button in an application on user device 1402 to terminate the parking session. At block 1432, the mobile location device 1404 transmits a request to end the parking session to server 1406. In some implementations (not shown) the server 1406 initiates the parking session termination due to factors such as the maximum legal parking time being reached, a prepaid parking session expired, or a separate parking session termination request was received from the user device 1402. In some implementations, the server 1406 may also initiate the parking session termination where the mobile location device 1404 runs out of power during a parking session or some other suitable reason the server 1406 is configured to terminate the parking session for prior to receiving a termination request from the mobile location device 1404. In some implementations, if the user manually tries to stop the parking session through the user device 1402 and the mobile location device 1404 does not respond, the server 1406 may terminate the parking session and trigger the payment process with payment processing server 1410 without further communicating with the mobile location device 1404 because the mobile location device 1404 is unreachable (e.g., the mobile location device 1404 may be turned off, run out of batteries, an issue occurred with cellular network coverage, etc.).

Returning to block 1434, the server 1406 receives the parking session termination request from mobile location device 1404 and ends the parking session. In some implementations, the server 1406 stores a log of all or some of the parking session, including the end time in database 1408. If the legal parking zone required payment (and the user did not prepay), the server 1406 calculates the required payment based on the time and parking zone fee. The server 1406 transmits the parking session charge to payment processing server 1410 as shown in block 1436. Payment processing server 1410 executes a charge (e.g., charging a credit card of the user or debiting the user's bank account) for the parking session for mobile location device 1404. Payment processing server 1410 then sends payment confirmation back to server 1406 as shown in block 1438. As noted above, in some implementations, parking in some legal parking zones may not require payment, thus the transaction with payment processing server 1410 may not be required.

In some implementations, server 1406 may then send a message to mobile location device 1404 and user device 1402 confirming the end of the parking session as illustrated in block 1440. In some implementations, server 1406 may also send log information regarding the parking session and a receipt for any charges made for the parking session as shown in block 1440.

In some implementations, mobile location device 1404 receives the parking session termination message at block 1442 and alerts the user in any suitable manner. In some implementations, the mobile location device 1404 alerts the user with a change to an LED (e.g., changing the LED to red, or flashings the LED in a particular pattern). Likewise, the user's user device 1402, after receiving the parking session termination message at block 1444, will alert the user in any suitable manner. One such display is illustrated in FIG. 13B. The user device 1402 may also display the payment receipt information in an application.

The process described above in FIG. 14 may be repeated any number of times when the mobile location device 1404 detects a possible parking event. It should be appreciated that the above described system, in some implementations, enables a user to park, knows the user is in a legal parking zone, and pays for parking automatically without the user taking any additional affirmative action (however it should be appreciated that in some implementations, the user may be required to affirmatively confirm the legal parking zone for the parking session, accept or authorize a credit card charge, bank debit, or other charge for the parking session).

In some implementations, where a user has prepaid for a parking session and the user is legally able to park for additional time, the system may automatically purchase additional time for the parking use if the vehicle and mobile location device has not moved at the expiration of the parking session. Alternatively, the geomapping server (e.g., server 1406) may automatically alert the user to purchase more time to extend the parking session or start a new parking session. It should be appreciated that in some implementations, functions of the mobile location device 1404 that enable the user to interface with mobile location device 1404 may be included in the user device 1402 (e.g., in a mobile application or in a vehicle infotainment application) to the extent that a user does not need to interact with the mobile location device 1404 to start and/or complete a parking session.

Figure 15:
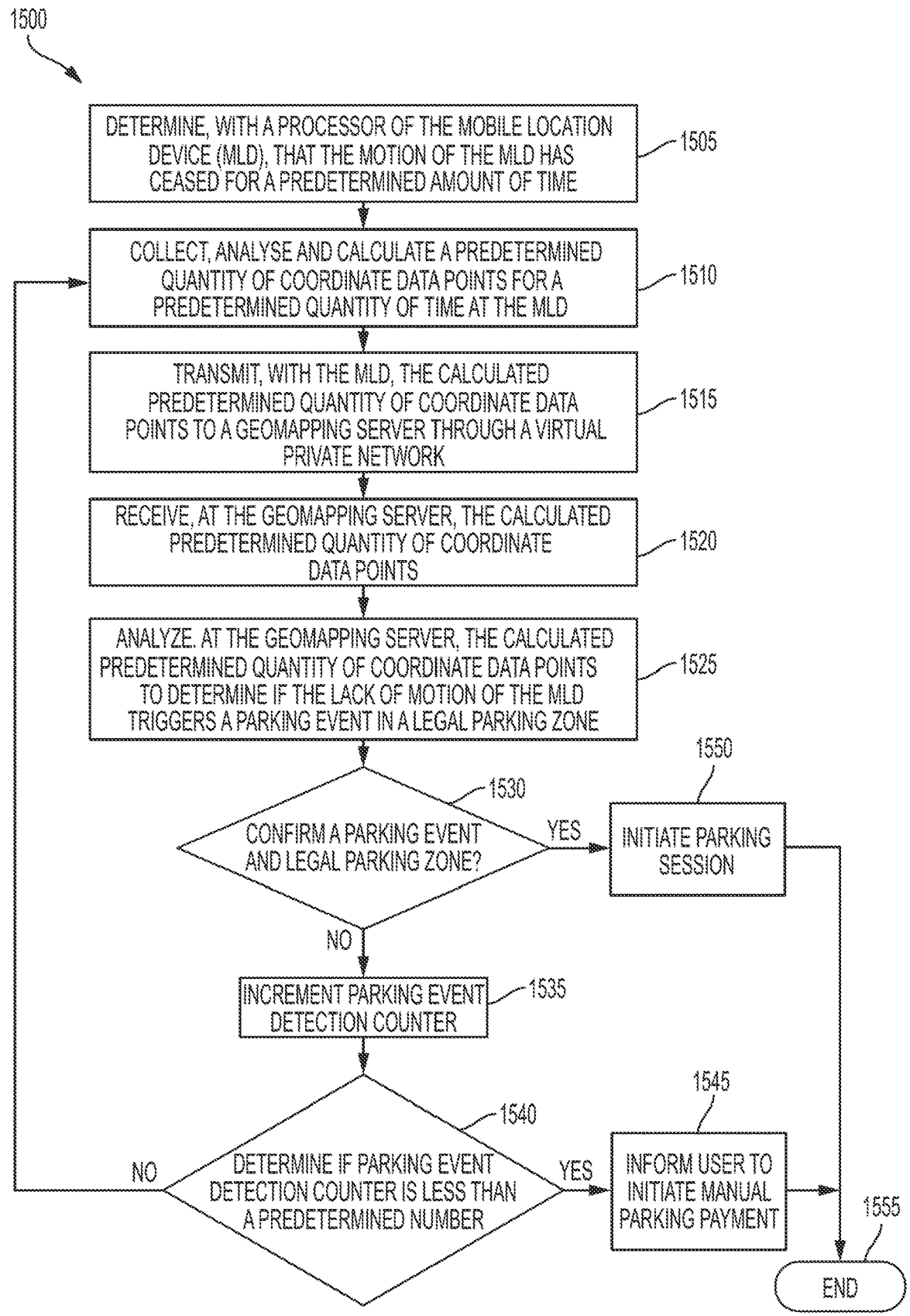
FIG. 15 is a flowchart that illustrates some implementations of the system and method for automatically detecting and processing a parking session.

FIG. 15 is a flowchart of process 1500 that illustrates some implementations of the system and method for automatically detecting a possible parking event, such as described in FIG. 14 blocks 1412-1444. At block 1505, the mobile location device determines, with a processor, that motion of the mobile location device has ceased for a predetermined amount of time or is below a predetermined threshold speed. At block 1510, the mobile location device collects, analyzes, and calculates a predetermined quantity of coordinate data points for a predetermined quantity of time for the mobile location device. Some implementations of the process of block 1510 was described in connection with FIG. 7 and FIG. 8. At block 1515, the mobile location device transmits the calculated predetermined quantity of coordinate data points to a geomapping server through a virtual private network or other suitable communication channel. The geomapping server receives the calculated predetermined quantity of coordinate data points at block 1520.

At block 1525, the geomapping server analyzes the calculated predetermined quantity of coordinate data points to determine if the lack of motion of the mobile location device triggers a parking event in a legal parking zone. As noted in FIG. 14, geomapping server may compare some or all of the predetermined quantity of coordinate data points against coordinates stored in association with legal parking zones. In some implementations, if the geomapping server determines that a predetermined quantity of coordinate data points are within two meters (or some other suitable distance) of a legal parking zone, then the geomapping server knows with high probability that the mobile location device is in a legal parking zone. In some implementations, the geomapping server compares the calculated predetermined quantity of coordinate data points (including a direction the mobile location device was traveling in some implementations) to stored road alignment data such as the coordinates of the centerline of a road and the coordinates of the curb edge of the road as part of the analysis. The high accuracy of the calculated predetermined quantity of coordinate data points enables the server to determine if the mobile location device (and vehicle) is closer to the center line of the road verses closer to the curb (which may indicate that the vehicle is in a traffic jam on a narrow road rather than attempting to park on the narrow road). The road alignment data also enables the geomapping server to discount bad coordinate data, such as if the calculated coordinate data indicates that a vehicle is positioned on a sidewalk or in a building (which may occur due to multipath signal distortion). If an appropriate match exists and other factors have ruled out issues such as a traffic jam on a narrow road, the geomapping server confirms that a parking event occurred and the parking event is in a legal parking zone at block 1530. The mobile location device and geomapping server may automatically initiate a parking session at block 1550 as discussed in FIG. 14 or permit a user of the mobile location device to manually start a parking session with the mobile location device (e.g., pressing a button) or with a software application on the user's user device (executing a start parking session). Then process 1500 ends.

On the other hand, if an appropriate coordinate match does not exist, the geomapping server transmits a message to the mobile location device indicating that a parking event did not occur or that the parking event is not in a legal parking zone at block 1530. In some implementations, the coordinates provided by the mobile location device may have been corrupted in a variety of different ways as noted above. In some implementations, the process 1500 includes permitting the mobile location device to obtain and calculate new coordinate data points. In some implementations, the mobile location device may attempt to confirm the parking event a predetermined quantity of times, such as 3 times. However, any suitable quantity of times can be used. In this way, the mobile location device is given one or more opportunities to obtain fresh set of location data to mitigate the reason for the previously unmatched coordinate data. In one such implementation, the geomapping server may increment a parking event detection counter at block 1535. If the incremented parking event detection counter is less than a predetermined number at block 1540, then the process returns to block 1510 for the mobile location device to obtain and calculate new coordinates to transmit to the geomapping server. If the incremented parking event detection counter is equal to a predetermined number at block 1540, then the process 1500 moves to block 1545. The geomapping server sends a message to the mobile location device, the user's user device, or both to inform the user that either parking at the current location is not permitted or that the user should initiate a manual parking payment process (e.g., feeding a parking meter or paying at a parking kiosk) and the process 1500 ends at block 1555. In some implementations, the process 1500 may be restarted manually or automatically after a predetermined amount of time for the same zone.

Figure 16C:
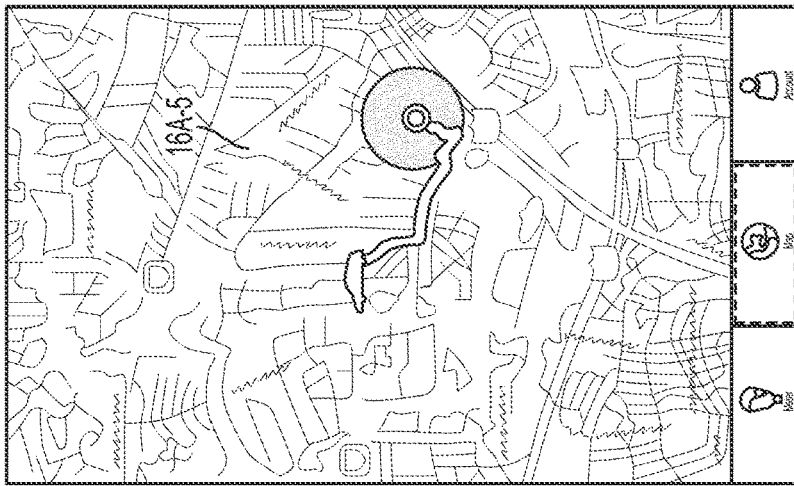
FIGS. 16A, 16B, and 16C illustrate example implementations of screen shots of a mobile application corresponding to various states of the system (current active session, no active session, and locating a vehicle).
Figure 16B:
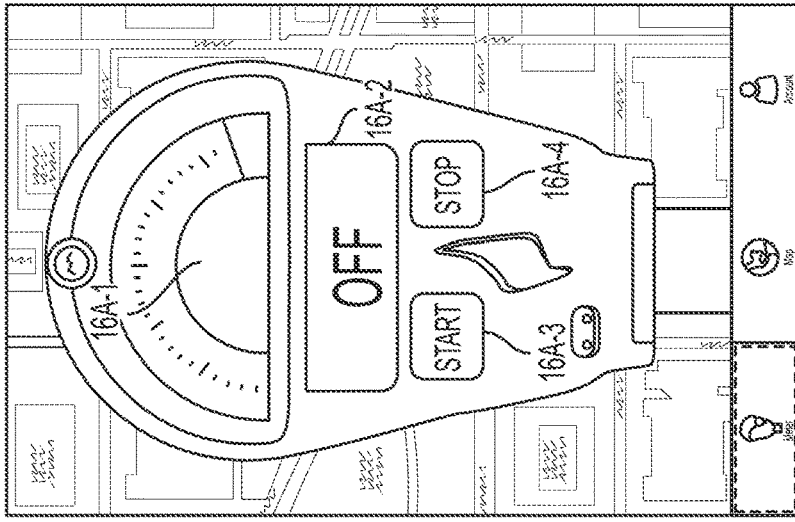
Figure 16A:
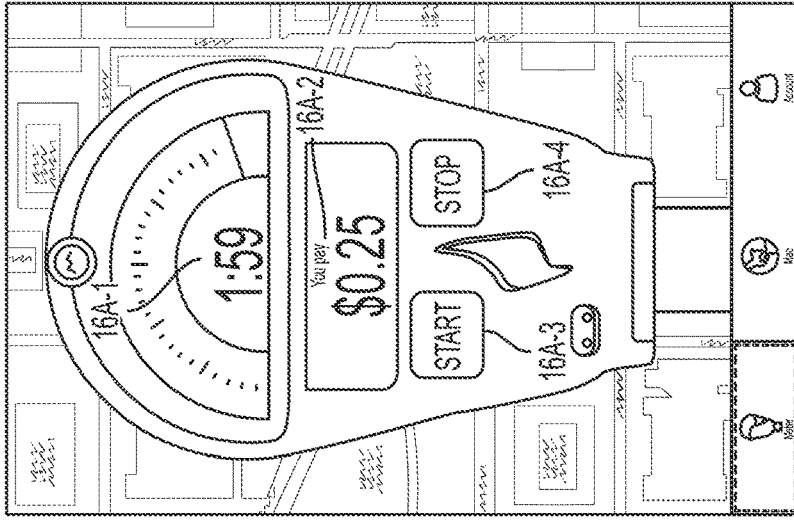

FIGS. 16A, 16B, and 16C illustrate example implementations of screen shots of a mobile application corresponding to various states of the parking system (current active session, no active session, and locating a vehicle). In some implementations, the user may choose to install a parking application on their user device 140, such as a smartphone, smartwatch or infotainment system, or other suitable portable or mobile device which is capable of wireless data communication and compatible with the parking application. In some implementations, the mobile application communicates parking-related events to the user received from a geomapping server and allows the user to remotely manage and control their parking account held at the geomapping server. In some implementations, the mobile application may obtain alerts regarding the mobile location device, such as battery levels, reminders to charge the battery of the mobile location device, operational issues with the mobile location device, etc.

FIG. 16A illustrates some implementations of a mobile app screen 1600 displayed on a user device when a mobile location device in a user's vehicle is in an active parking session. Reference 16A-1 shows the time left until the expiration of the maximum time allowed to park in the zone. Reference 16A-2 shows the cost of parking that has been incurred by the user since the beginning of the parking session in some example implementations. If the parking is free and the vehicle is parked in a zone known to the system, then Reference 16A-1 may display the time left until the end of the maximum stay in a given parking spot and Reference 16A-2 may reflect a $0 cost incurred in some implementations. For example, some U.S. cities have on-street parking zones where parking is only allowed at given time periods and for a maximum hourly limit, e.g., 2 hours. So that the user does not have to remember to return to their vehicle in time, the mobile application can be used to set necessary reminders. In some implementations, the reminders are created automatically for the user when the mobile application (the user device) communicates with the geomapping server. The time and duration limits for parking in that zone can be stored in a database (e.g., database 1408 in FIG. 14) associated with the system.

Reference 16A-3 displays a touch-responsive "start" button having the same functionality as a button on the mobile location device that can be used to start a parking session manually in some example implementations. Reference 16A-4 displays a touch-responsive "stop/cancel" button having the same functionality as a button on the mobile location device that can be used to stop a parking session manually in some implementations. The mobile application thus provides remote interaction with the system without using the mobile location device's physical interface. However, as noted above, in some implementations, the user device (and the mobile application) may communicate directly with the mobile location device and may control the mobile location device through this channel of communication and also access the parking and payment system through the mobile location device.

FIG. 16B shows another implementation of a screen 1610 displayed by the mobile application when the mobile location device and vehicle are not parked in any legal parking zone or any legal parking zone that requires access to the parking and payment system. Accordingly, in some implementations, reference 16A-1 does not display any time remaining and reference 16A-2 displays "OFF" because no cost accrual meter is running.

FIG. 16C illustrates a built-in map interface screen 1620 in some implementations that can be used by the users of the parking and payment system to locate their parked vehicle and reach it expeditiously by following the supplied routing directions 16A-5 (if needed). The map interface can be used in other implementations to communicate to the user the information about legal parking zones and guide the users to the zones most relevant to their destination. In further implementations, the information included on the map interface includes hourly limit and rates for legal parking zones.

In some implementations, the map interface retrieves spot availability information in real (or near real) time from the parking and payment system and highlights the locations of empty parking spaces to assist the user in rapidly locating a parking spot. In some implementations, the screen 1620 may enable the user to select a button to obtain the closest parking, prices of the parking spots, and space availability. In some implementations, when many mobile location devices are in use, the geomapping server tracks what legal parking zones are occupied with a mobile location device and what legal parking zones are not occupied with mobile location devices.

In some implementations, the geomapping server tracks and stores, in real time or near real time, currently occupied spaces that are being vacated by vehicles using the mobile location device (e.g., mobile location devices that have very recently ended a parking session and are moving). When a user is searching for a parking space (also referred to herein as a legal parking space) within a legal parking zone that is nearby the user's current location, the geomapping server can send such a user the recently vacated parking spaces known to the geomapping server in some implementations. The geomapping server may send such information to a user device of the user (so that the user can obtain a map and directions to the recently vacated spaces). In some implementations, the determination of recently vacated parking spaces may be based on a predetermined period of time. For example, a recently vacated legal parking space within a legal parking zone may comprise a legal parking space that was vacated in the last 2-4 minutes. This predetermined number may change depending on the jurisdiction, the time of day, or other suitable factors (to adjust for very dense urban areas where legal parking spaces are in such high demand that even 60 seconds may make the information stale and potentially incorrect). It should therefore be appreciated that one benefit to the mobile location devices communicating with the geomapping server to end parking sessions is that the geomapping server will have real time or near real time data on availability of legal parking spaces within legal parking zones. As the number of mobile location devices increase in a given geographic area, the usable quantity of real time or near real time parking data will likewise increase.

Figure 17A:
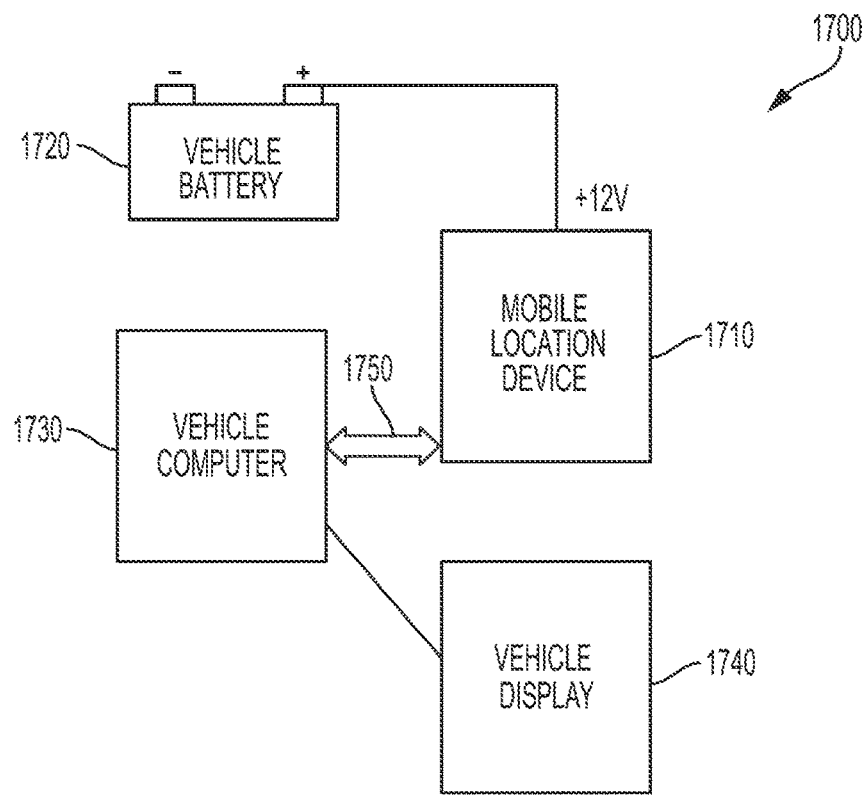
FIGS. 17A and 17B illustrate block schematic diagrams showing example implementations where components of a mobile location device are integrated into or connected to a vehicle's on-board electronic system.
Figure 17B:
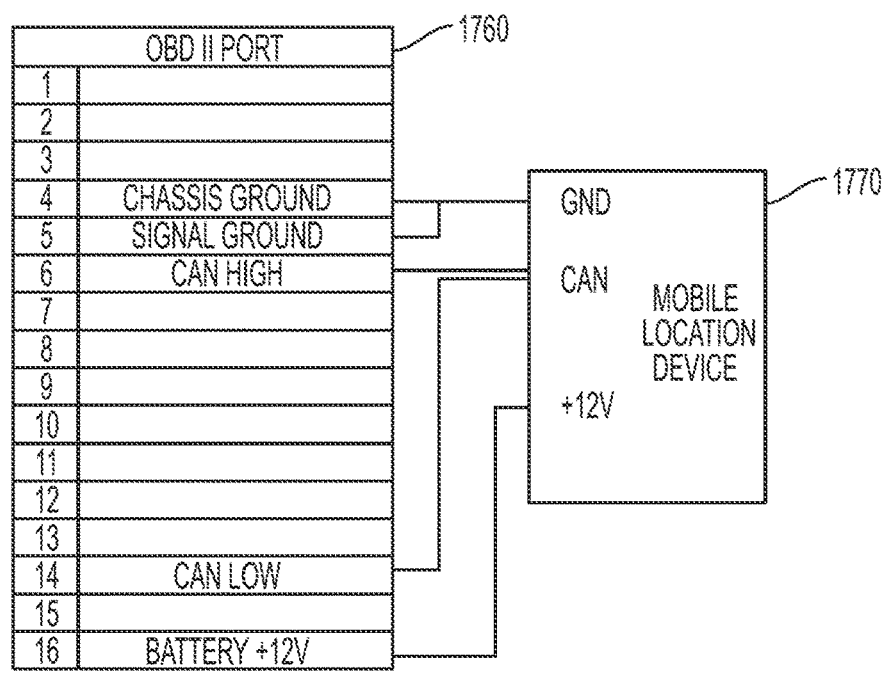

FIGS. 17A and 17B illustrate some implementations in which the mobile location device 1710 (which corresponds to mobile location device 10) is integrated (or embedded) into an on-board electronic system of a vehicle 1700 (e.g., vehicle 20). The vehicle computer 1730 can be connected to the mobile location device 1710 via an existing bus link, such as a controller area network (CAN) interface (1750). In some implementations, the vehicle computer 1730 controls a vehicle display 1740, which in some implementations may be a display of an interactive embedded infotainment system, and can communicate user device messages and receive and transmit user responses, such as for example energy dispensing, parking, tolling, curbside pickup, and the like, through the vehicle display 1740 and, in some implementations, the vehicle audio system (not shown). The vehicle battery 1720 is used as a power supply in some implementations. FIG. 17B illustrates some implementations in which the vehicle computer 1730 integration is implemented using a standard OBD II (On-board diagnostics) port 1760 in the vehicle 1700. The exact integration schema for such an integration may depend on the vehicle manufacturer and specific features of the vehicle. The integration illustrated in FIG. 17B is merely an example and other forms of integration may be possible or required. In some implementations, the CAN bus high and low can be used for the communications link, the signal and chassis ground can be used for ground together, and +12V supply can be used to power the mobile location device 1770 (which may correspond to mobile location device 10).

In some implementations, the mobile location device is not integrated in its entirety into the vehicle on-board electronic system. For example, built-in communications systems are present in certain vehicle models and include a wireless communication interface that can be adapted to establish a link between the mobile location device and a geomapping server. In such instances only certain components of the mobile location device, such as the high accuracy geolocation positioning system and certain algorithms (whether implemented in hardware or software), will need to be additionally integrated into the vehicle system.

In some implementations, the mobile location device can be configured with an alpha-numeric display that can provide the user with useful information and also aids parking enforcement agents enforce parking laws. In some implementations, the mobile location device has an electronic display to communicate messages to the user and the parking enforcement agents, such as the time of expiration of a current parking session, battery level of the mobile location device, or reminders to charge the mobile location device if it has a low battery level. The user can choose to pay attention to such messages on the display screen and follow them to make sure the system works properly. If the mobile location device is placed in a windshield of the user's vehicle and can be easily seen from outside of the vehicle, parking enforcement agents can use the information from the display to establish whether the vehicle is legally parked and that payment will be processed for the vehicle to stay in the parking zone. For example, a message to parking enforcement may read "EXPIRES AT 1:23 PM", which, if the current time is, for example, 1:11 PM, the message tells the enforcement agent that the vehicle has more time to stay legally in the parking spot.

In some implementations, an LED light on the mobile location device can be used in place of the display screen or as an additional indicator of active parking sessions and other messages, such as error messages, to be communicated to the user and parking enforcement agents. For example, the mobile location device can illuminate the LED light to a solid green (not flashing) when the parking session is active. In another example, mobile location device can cause the LED light to flash or blink if an error has occurred or if a parking session has not been started.

In another implementation, the mobile location device can be fitted with a speaker to facilitate communication with the user by providing additional messages in an audio format. For example, when the user arrives in a legal parking zone and the mobile location device does not move for a preset time (e.g., 30 seconds, 1 minute, some other suitable amount of time), the mobile location device may attempt to register a parking event and announces by the speaker, the information retrieved from the geomapping server, such as the hourly limit and rate for a legal parking zone. Such a message may say: "You have successfully parked your vehicle. You can stay here for two hours until 1:23 PM and will pay $2 per hour," in an example implementation.

In some implementations, the mobile location device can be configured to communicate with a parking enforcement device or an energy dispensing device. For example, in an implementation where the mobile location device includes a low energy wireless communication system, the mobile location device can receive requests for information from the parking enforcement device also configured with a compatible low energy wireless communication system. The mobile location device can provide information about an active parking session for the mobile location device. Alternatively, where the mobile location device does not have an active parking session, the mobile location device can provide its identification information to the parking enforcement device so that the parking enforcement agent can generate a ticket based on the account information of the mobile location device. In this manner, a parking enforcement agent can quickly walk by or drive by vehicles with mobile location devices and automatically know which vehicles are legally parked. In some implementations, the parking enforcement agent can send an invoice for a parking violation to the geomapping server for processing. In this manner, the geomapping server can alert the user of the parking violation and provide the user with a ticket. In some implementations, the geomapping server enables the user to pay for the ticket through the parking and payment system. The user can authorize the payment using the user device application or by pressing a button on the mobile location device to authorize the payment. In some implementations, when a parking enforcement agent has generated a ticket associated with one mobile location device and sent the information to the geomapping server, the geomapping server may send alerts to users of other nearby (e.g., within a 3 block radius, or other suitable radius) mobile location devices that are not in legal parking zones (or have inactive parking sessions) to move their vehicles to legal parking zones or to activate a parking session. In an energy dispensing scenario, the mobile location device can communicate with an energy dispensing device using a compatible low energy wireless communication system to request authorization and activation of an energy dispensing device. For example, the mobile location device can communicate with a fuel pump to provide a user's information such as credit card information that is used to authorize a fueling session to activate a fuel pump to dispense fuel. The interaction between the fuel pump and the payment processor can replace or be an alternative to a geomapping server requesting authorization of a fuel pump as shown in FIG. 11 at blocks 1122 and 1124.

In some implementations, a user with a mobile location device may be supplied with a unique barcode, QR code, or other machine readable code that is associated with the mobile location device or with the user's account at the geomapping server. The machine readable code can be placed in a visible area of the user's vehicle while the mobile location device remains hidden in the vehicle. When a parking enforcement agent scans the machine readable code, a parking enforcement device can send a request to a geomapping server for information associated with the machine readable code. If the mobile location device has activated a parking session in a legal parking zone, the queried geomapping server will respond with a message to the parking enforcement device that the vehicle is legally parked. The geomapping server may provide other useful information such as when the parking session expires and whether additional parking time can be purchased. The geomapping server may also have other information about the vehicle (e.g., how many tickets are associated with the vehicle, whether any outstanding law enforcement flags are associated with the vehicle).

In some implementations, the geomapping server collects crowdsourced data from users to update its database of legal parking zones. In some implementations, the user may select a function on the user's user device which sends a request to a geomapping server to obtain coordinates of the user's mobile location device as being in a new legal parking zone. The geomapping server may send a request for the mobile location device to calculate its current coordinates and send such coordinates back to the geomapping server for review as a potentially new legal parking zone. In some implementations, the geomapping server may send a request to a local or state government server for confirmation that such coordinates are associated with a new legal parking zone. If confirmation is received from a government server, then the geomapping server may update its database to reflect that such coordinates are a new legal parking zone for future parking sessions. In some implementations, a button on the mobile location device may be associated with informing the geomapping server that a current position of the mobile location device is associated with a new legal parking zone.

In some implementations, if the geomapping server receives a plurality of requests from different users that a particular set of calculated coordinate data is associated with a new legal parking zone, the geomapping server may automatically add such calculated coordinate data to its database as a new legal parking zone for future parking sessions. The minimum quantity of requests may be five or more requests; provided however, that any suitable number of requests may be used as the threshold to add the calculated coordinate data to the geomapping server's database of legal parking zones. In some implementations, the user may provide additional information to the geomapping server regarding the new legal parking zone, such as maximum parking times, costs per time in the new legal parking zone. In some implementations, this additional information is added to the database when a predetermined amount of users provide the same information about the new legal parking zone. In some implementations, the user may provide such information through the application on the user's user device.

Implementations described herein may be implemented in hardware, firmware, software, or any combination thereof. Implementations of the disclosure herein may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); hardware memory in handheld computers, PDAs, smart phones, and other portable devices; magnetic disk storage media; optical storage media; USB drives and other flash memory devices; Internet cloud storage, and others. Further, firmware, software, routines, instructions, may be described herein as performing certain actions. However, it should be appreciated that such descriptions are merely for convenience and that such actions in fact result from computing devices, processors, controllers or other devices executing the firmware, software, routines, instructions, etc.

Although method/process operations (e.g., blocks) may be described in a specific order, it should be understood that other housekeeping operations can be performed in between operations, or operations can be adjusted so that they occur at different times or can be distributed in a system which allows the occurrence of the processing operations at various intervals associated with the processing, as long as the processing of the overlay operations are performed in the desired way.

The present disclosure is not to be limited in terms of the particular implementations described in this disclosure, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations have been described. Various modifications may be made without departing from the spirit and scope of the disclosure. For example, various forms of the method/process flows shown above may be used, with operations or steps re-ordered, added, or removed. Accordingly, other implementations are within the scope of the following claims.

We claim:

1. A location device comprising:
a processor; and
a memory device that stores a plurality of instructions, which when executed by the processor, causes the processor to be configured to:
receive, global navigation satellite systems (GNSS) data and vehicle motion data, wherein the GNSS data and the vehicle motion data are associated with a vehicle, and wherein the GNSS data comprises one or more signal strength indicators;
calculate, in an estimation filter operating in a first mode, a location of the vehicle based on the GNSS data and the vehicle motion data;
determine from the one or more signal strength indicators not to use first velocity values from the GNSS data;
calculate second velocity values based at least in part on the vehicle motion data;
determine that a velocity of the vehicle is below a threshold velocity, wherein the velocity of the vehicle is determined based in part of the second velocity values;
alter the estimation filter to operate in a second mode based on the velocity being below the threshold velocity;
calculate, in the estimation filter operating in the second mode, a position location of the vehicle, wherein at least some of the vehicle motion data is altered for the estimation filter to determine the position location of the vehicle;
transmit the position location of the vehicle to a geomapping server enabling a vehicle based transaction.

2. The location device of claim 1, wherein the alteration of the at least some of the vehicle motion data results in data for the vehicle velocity being altered.

3. The location device of claim 1, wherein the alteration of the at least some of the vehicle motion data results in data for a vehicle yaw rate being altered.

4. The location device of claim 1, wherein the processor is further configured to calculate and capture a plurality of location points when the estimation filter is operating in the second mode.

5. The location device of claim 1, wherein the second velocity values are calculated at least in part using vehicle acceleration data from the vehicle motion data.

6. The location device of claim 1, wherein the estimation filter is a Kalman filter, and wherein the Kalman filter includes a plurality of modes.

7. The location device of claim 1, wherein the vehicle based transaction is triggered based on the position location being in a predetermined location and the vehicle based transaction is an energy dispensing session at an energy dispensing device.

8. The location device of claim 7, wherein the processor is further configured to enable the energy dispensing session at the energy dispensing device using a two-factor authentication, wherein a first authentication factor is based at least in part on the transmitted position location, and a second authentication factor is based at least in part on a communication from a user device.

9. The location device of claim 8, wherein the communication from a user device confirms the energy dispensing device.

10. The location device of claim 8, wherein the energy dispensing device is a first energy dispensing device and the communication from a user device confirms a second energy dispensing device.

11. The location device of claim 1, wherein the energy dispensing device is a fuel pump.

12. The location device of claim 1, wherein the energy dispensing device is an electric vehicle charger.

13. The location device of claim 1, wherein the vehicle based transaction is triggered based on the position location being in a predetermined location and the vehicle based transaction is a parking session.

14. The location device of claim 13, wherein the predetermined location is a legal parking zone.

15. The location device of claim 13, wherein the plurality of instructions further cause the processor to:
determine that the vehicle is moving faster than a predetermined speed;
transmit to the geomapping server a message indicating that the vehicle is moving faster than the predetermined speed; and
cause the parking session to end based on the transmitted message.

16. The location device of claim 1, wherein the vehicle based transaction is a toll transaction that automates a toll payment based on the position location of the vehicle.

17. A method for processing vehicle location comprising:
receiving, global navigation satellite systems (GNSS) data and vehicle motion data, wherein the GNSS data and the vehicle motion data are associated with a vehicle, and wherein the GNSS data comprises one or more signal strength indicators;
calculating, in an estimation filter operating in a first mode, a location of the vehicle based on the GNSS data and the vehicle motion data;
determining from the one or more signal strength indicators not to use velocity values from the GNSS data;
calculating second velocity values based at least in part on the vehicle motion data;
determining that a velocity of the vehicle is below a threshold velocity, wherein the velocity of the vehicle is determined based in part of the second velocity values;
altering the estimation filter to operate in a second mode based on the velocity being below the threshold velocity;
calculating, in the estimation filter operating in the second mode, a position location of the vehicle, wherein at least some of the vehicle motion data is altered for the estimation filter to determine the position location of the vehicle;
transmitting the position location of the vehicle to a geomapping server enabling a vehicle based transaction.

18. The method of claim 17, wherein the alteration of the at least some of the vehicle motion data results in data for the vehicle velocity being altered.

19. The method of claim 17, wherein the alteration of the at least some of the vehicle motion data results in data for a vehicle yaw rate being altered.

20. The method of claim 17, further comprising, calculating and capturing a plurality of location points when the estimation filter is operating in the second mode.

21. The method of claim 17, wherein the second velocity values are calculated at least in part using vehicle acceleration data from the vehicle motion data.

22. The method of claim 17, wherein the estimation filter is a Kalman filter, and wherein the Kalman filter includes a plurality of modes.

23. The method of claim 17, wherein the vehicle based transaction is triggered based on the position location being in a predetermined location and the vehicle based transaction is an energy dispensing session at an energy dispensing device.

24. The method of claim 23, further comprising, enabling the energy dispensing session at the energy dispensing device using a two-factor authentication, wherein a first authentication factor is based at least in part on the transmitted position location, and a second authentication factor is based at least in part on a communication from a user device.

25. The method of claim 24, wherein the communication from a user device confirms the energy dispensing device.

26. The method of claim 24, wherein the energy dispensing device is a first energy dispensing device and the communication from a user device confirms a second energy dispensing device.

27. The method of claim 17, wherein the energy dispensing device is a fuel pump.

28. The method of claim 17, wherein the energy dispensing device is an electric vehicle charger.

29. The method of claim 17, wherein the vehicle based transaction is triggered based on the position location being in a predetermined location and the vehicle based transaction is a parking session.

30. The method of claim 29, wherein the predetermined location is a legal parking zone.

31. The method of claim 29, further comprising:
determining that the vehicle is moving faster than a predetermined speed;
transmitting to the geomapping server a message indicating that the vehicle is moving faster than the predetermined speed; and
causing the parking session to end based on the transmitted message.

32. The method of claim 17, wherein the vehicle based transaction is a toll transaction that automates a toll payment based on the position location of the vehicle.

* * * * *